4 000,242

United States Statutory Invention Registration [19]

[11] Reg. Number: H42

[45] Published: Apr. 1, 1986

Itoh et al.

[54] SILVER HALIDE COLOR PHOTOGRAPHIC MATERIAL

[75] Inventors: Isamu Itoh; Hidetoshi Kobayashi; Katsuyoshi Yamakawa, all of Kanagawa, Japan

[73] Assignee: Fuji Photo Film Co., Ltd., Kanagawa, Japan

[21] Appl. No.: 778,043

[22] Filed: Sep. 20, 1985

[51] Int. Cl.[4] ..... G03C 7/32; G03C 7/34

[52] U.S. Cl. ..... 430/543; 430/581

*Primary Examiner*—John F. Terapane
*Assistant Examiner*—Jack Thomas
*Attorney, Agent, or Firm*—Sughrue, Mion, Zinn, Macpeak & Seas

[57] ABSTRACT

A two-equivalent cyan dye forming coupler represented by the general formula (I) substituted with at least one substituent represented by general formula (II), having substituents as defined in the specification. This coupler has excellent color forming properties and good dispersibility as well as good color hue and excellent fastness to heat and light. The color photographic material containing the two-equivalent cyan dye forming couplers does not exhibit a decrease in color density of cyan color images even when it is processed with a bleaching solution which has a weak oxidation power or a bleaching solution which is exhausted.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOGRAPHIC MATERIAL

FIELD OF THE INVENTION

The present invention relates to a cyan dye forming coupler, and more particularly, to a silver halide color photographic material containing a novel 2-equivalent cyan coupler.

BACKGROUND OF THE INVENTION

When a silver halide color photographic material is imagewise exposed and subjected to color development, a dye forming coupler reacts with an oxidized aromatic primary amine developing agent to form a color image. In general, in this photographic process, color reproduction is achieved by a substractive process for reproducing blue, green, and red images, in which yellow, magenta and cyan color images, i.e., the complementary colors of the foregoing colors, respectively, are formed.

In this case, for the formation of cyan color images, phenol derivatives or naphthol derivatives are mainly used as the couplers. In a color photographic process, a color forming coupler is added to a developing solution or is incorporated in a light-sensitive photographic silver halide emulsion layer or other color image forming layer, and by reacting with the oxidation product of a color developing agent formed upon development, a non-diffusible dye is formed.

The reaction of the coupler and the oxidized color developing agent occurs at an active site on the coupler and a coupler having a hydrogen atom at the active site is a 4-equivalent coupler, that is, a coupler which stoichiometrically requires 4 moles of silver halide having development centers for forming 1 mole of dye. On the other hand, a coupler having at the active site a group capable of being released as an anion is a 2-equivalent coupler, that is, a coupler which requires only 2 moles of silver halide having development centers for forming 1 mole of dye. Accordingly, when using the 2-equivalent coupler, the amount of silver halide in a silver halide emulsion layer can generally be reduced, and hence the layer thickness can be reduced as compared to the case of using the 4-equivalent coupler, whereby the processing time for the photographic material can be shortened, and the sharpness of the color images is improved.

Typical examples of such groups capable of being released include a sulfonamido group as described in U.S. Pat. No. 3,737,316; an imido group as described in U.S. Pat. No. 3,749,735; a sulfonyl group as described in U.S. Pat. No. 3,622,328; an aryloxy group as described in U.S. Pat. No. 3,476,562; an acyloxy group as described in U.S. Pat. No. 3,311,476; a thiocyano group as described in U.S. Pat. No. 3,214,437; an isothiocyanate group as described in U.S. Pat. No. 4,032,345; a sulfonyloxy group as described in U.S. Pat. No. 4,046,573; an alkylthio group as described in U.S. Pat. No. 3,227,554; a thiocarbonyloxy group as described in Japanese patent application (OPI) No. 51939/77 (the term "OPI" as used herein refers to a "published unexamined Japanese patent application"); an aralkenylcarbonyloxy group as described in Japanese Patent Publication No. 46059/82; an acylamino group as described in Japanese patent application (OPI) No. 21828/76; an aminomethyl group as described in Japanese patent application (OPI) No. 52828/76 and Japanese Patent Publication No. 6537/81; a heterocyclic oxy group as described in Japanese patent application (OPI) Nos. 37425/72 and 200039/82; and a substituted alkoxy group as described in U.S. Pat. No. 3,227,551, Japanese patent application (OPI) Nos. 90932/77, 99938/78, 105226/78, 14736/79, 66129/79, 32071/80, 65957/80, 1938/81, 6539/81, 12643/81, 27147/81 and 80044/81 and Japanese Patent Publication Nos. 120334/75, 37822/79, 6539/81, 3934/82 and 46060/82.

Further, it is disclosed that an alkyloxy group, an aryloxy group and a heterocyclic oxy group as described in Japanese patent application (OPI) Nos. 35731/85, 49335/85 and 49336/85; and an alkylthio group, an arylthio group and a heterocyclic thio group as described in Japanese patent application (OPI) Nos. 50533/85 and 91355/85 are excellent as a group capable of being released for a cyan coupler having a phenylureido group at the 2-position of a phenol in view of reactivity.

Furthermore, by properly selecting the releasable group of a coupler, it is possible to incorporate, for example, a diffusible dye moiety in the releasable group and apply the coupler to a diffusion transfer photographic system of forming dye images of diffusible dye in an image-receiving layer by utilizing the released dye. Couplers of this type are called "diffusible dye-releasing couplers" and they are described, for example, in U.S. Pat. Nos. 3,227,550 and 3,765,886, U.S. Defensive Publication T 900,029, and British Pat. No. 1,330,524.

Also, certain kinds of colored 2-equivalent couplers have a masking effect for color correction of dye images. These couplers are called "colored couplers" and are described, for example, in Japanese patent application (OPI) No. 26034/76.

A 2-equivalent coupler than can release a product which has the effect of inhibiting development is called a "development inhibitor releasing coupler", and since the coupler inhibits development in proportion to the amount of developed silver, the coupler has the effect of improving graininess of images, controlling gradation of images, and improving the color reproducibility. Also, the coupler can be utilized for a diffusion transfer system by utilizing the action to the adjacent layer. Such couplers are described, for example, in U.S. Pat. No. 3,227,554, Japanese patent application (OPI) No. 122335/74, and West German patent application (OLS) No. 2,414,006.

Since 2-equivalent couplers essentially have several excellent advantages and applicability as compared with 4-equivalent couplers as described above, 2-equivalent couplers are frequently used.

On the other hand, phenol series cyan couplers having a ureido group at the 2-position and an acylamino group at the 5-position are said to form color images excellent in fastness to heat or light by color development as compared to other phenol series cyan couplers or naphthol series cyan couplers and these cyan couplers are described, for example, in Japanese patent application (OPI) Nos. 65124/81, 204543/82, 204544/82, 204545/82, 33249/83, 33250/83, 33251/83, and 33252/83. These cyan couplers include 2-equivalent couplers.

However, heretofore known phenol series 2-equivalent cyan couplers having a ureido group at the 2-position and an acylamino group at the 5-position have some disadvantages in that their coupling reactivity is insufficient, they have a significant color fog problem, they have poor dispersibility thus causing coating problems, and such couplers are unstable and hence cannot be stored for a long period of time without degradation, while these couplers are advantageous in their excellent fastness to heat or light in comparison with other phenol series cyan couplers or naphthol series cyan couplers. Further, the stability of the color images formed by color development by heat or light is still insufficient when storing the color images for a long period of time.

SUMMARY OF THE INVENTION

An object of the present invention, therefore, is to provide a silver halide color photographic material using a novel 2-equivalent cyan coupler having improved color forming properties and excellent dispersibility.

Another object of the present invention is to provide a silver halide color photographic material using a cyan coupler having excellent color forming properties and dispersibility and forming a color image having excellent color hue and fastness to heat and light.

A further object of the present invention is to provide a silver halide color photographic material showing substantially no reduction in color density when processing the color photographic material containing the coupler in a bleaching solution having a weak oxidation power or an exhausted bleaching solution.

A still further object of the present invention is to provide a high-speed silver halide color photographic material using a cyan coupler having excellent color forming properties.

Other objects of the present invention will become apparent from the following detailed description and examples.

The above-described objects of the present invention can be accomplished by a silver halide color photographic material comprising a support having thereon at least one silver halide emulsion layer wherein the photographic material contains at least one cyan color image forming coupler represented by the general formula (I) described below substituted with at least one substituent represented by the general formula (II) described below.

[I]

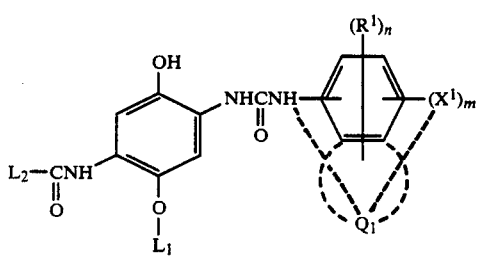

wherein $X^1$ represents a cyano group, a sulfonyl group, an acyl group, a sulfamoyl group, a carbamoyl group, a sulfonamido group, a carbonamido group, a sulfamido group, a trifluoromethyl group or a halogen atom; m represents an integer of 1 to 5 when $X^1$ represents a halogen atom, and an integer of 1 to 3 when $X^1$ represents a group other than a halogen atom, and when m represents an integer of 2 or more, $X^1$ may be the same or different; $R^1$ represents a substituent on the benzene ring or a condensed ring including the benzene ring; n represents 0 or an integer of 1 to 6; $Q^1$ represents a non-metallic atomic group necessary to form a 5-membered or 6-membered condensed ring including the benzene ring which may or may not be present, $X^1$, $R^1$ and the ureido group may be bonded at any position of the benzene ring and the condensed ring formed with $Q^1$, $m+n \leqq 7$; $L_1$ represents a group capable of being released as $L_1\text{-}O^{\ominus}$ upon the reaction with an oxidation product of a color developing agent and is selected from a substituted alkyl group, a substituted aryl group and a heterocyclic group; and $L_2$ represents an alkyl group, an aryl group, a heterocyclic group, an alkyloxy group, an aryloxy group or an amino group;

[II]

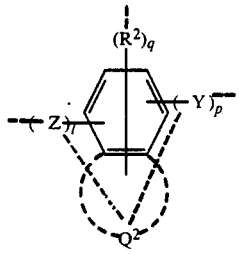

wherein Z represents a hydroxy group, a carbonamido group, a sulfonamido group, a sulfamido group, an oxycarbonamido group, a sulfinamido group or a phosphonamido group, l represents an integer of 1 to 3; Y represents a sulfonyl group, a sulfamoyl group, an acyl group, an oxycarbonyl group, a carbamoyl group, a phosphonyl group, a phosphamoyl group or an imino group; p represents an integer of 1 to 2; $R^2$ represents a substituent other than the groups represented by Z and Y which may be on the benzene ring or a condensed ring including the benzene ring; q represents 0 or an integer of 1 to 6; $Q^2$ represents a non-metallic atomic group necessary to form a 5-membered or 6-membered condensed ring including the benzene ring which may or may not be present; Z, Y and $R^2$ may be present at any position of the benzene ring and the condensed ring formed with $Q^2$; $p+q+l \leqq 8$; and the group represented by the general formula (II) is connected to the coupler represented by the general formula (I) through Y, Z or $R^2$, e.g., as an ether linkage when Z is a hydroxy group or as a divalent group of the groups recited above for Y, Z or $R^2$.

DETAILED DESCRIPTION OF THE INVENTION

The cyan color image forming coupler represented by the general formula (I) used in the present invention will be explained in detail below.

In the general formula (I), the substituent represented by $R^1$ is preferably an alkyl group, an alkoxy group, an acyloxy group or an oxycarbonyl group and these groups may be further substituted. Preferred examples of the condensed rings formed by the benzene ring and $Q^1$ include a naphthalene ring, a quinoline ring, an isoquinoline ring, a benzotriazole ring, a benzimidozole ring, a benzothiazole ring, a benzoxazole ring, an indole ring, an indazole ring or a phthalimide ring. A naphthalene ring is particularly preferred. The substituent represented by $L_1$ is preferably a substituted aryl group. The substituent represented by $L_2$ is preferably an alkyl group and is more preferably an alkyl group substituted with an aryloxy group.

In the general formula (II), the substituent represented by $R^2$ is preferably a halogen atom, a cyano group, a nitro group, a carboxy group, a sulfo group, an alkyl group which may be substituted, an aryl group which may be substituted, an alkoxy group which may be substituted or an acyloxy group which may be substituted. Preferred examples of the condensed rings formed by the benzene ring and $Q^2$ include those described with respect to $Q^1$ above. A naphthalene ring is particularly preferred.

The group represented by the general formula (II) is connected through Y, Z or $R^2$ thereof to $L_1$, $L_2$, $X^1$ or $R^1$ of the cyan coupler represented by the general formula (I). In a preferred embodiment, one or two of the groups represented by the general formula (II) are connected to the cyan coupler represented by the general formula (I), or the group represented by the general formula (II) is connected through its two bonds to two moles of the cyan coupler represented by the general formula (I). It is particularly preferred that the group represented by the general formula (II) is connected through Y or Z thereof to $L_1$, $L_2$ or $X^1$ of the cyan coupler represented by the general formula (I).

Of the phenol series 2-equivalent cyan couplers according to the present invention, these represented by the general formula (III) described below substituted with at least one substituent represented by the above-described general formula (II) are preferred.

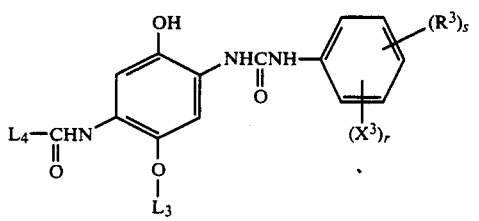

[III]

wherein $X^3$, $R^3$, $L_3$ and $L_4$ have the same meanings as defined for $X^1$, $R^1$, $L_1$ and $L_2$ in general formula (I) respectively; s represents 0 or an integer of 1 to 4; and r represents an integer of 1 to 5 when $X^3$ represents a halogen atom, and an integer of 1 to 2 when $X^3$ represents a group other than a halogen atom defined for $X^3$ and when r represents an integer of 2 or more, $X^3$ may be the same or different. When r represents an integer of 1 or 2, it is preferred that at least one $X^3$ is present at the 3-position or 4-position to the ureido group.

The cyan color image forming coupler represented by the general formula (III) will be explained in detail below.

Preferred examples of the group represented by $X^3$ include a cyano group, a sulfonyl group (for example, a methylsulfonyl group, a butylsulfonyl group, a phenylsulfonyl group, a dodecylsulfonyl group, a p-hydroxyphenylsulfonyl group or a p-methanesulfonamidophenylsulfonyl group), a sulfonamido group (for example, a methylsulfonamido group, a propylsulfonamido group, a phenylsulfonamido group, a hexadecylsulfonamido group, a p-hydroxyphenylsulfonamido group, a p-phenylsulfonamidophenylsulfonamido group, a 3-hydroxybutylsulfonamido group or a 2-methoxyethylsulfonamido group), a sulfamoyl group (for example, a diethylaminosulfamoyl group, a morpholinosulfamoyl group, an octylsulfamoyl group, a phenylsulfamoyl group, a 2-methoxyethylsulfamoyl group, a 3-carboxypropylsulfamoyl group, a p-methylsulfonylphenylsulfamoyl group or a p-acetylphenylsulfamoyl group), a carbonamido group (for example, an acetamido group, a butanamido group, a benzamido group, a p-hydroxybenzamido group or a hexadecylamido group), a carbamoyl group (for example, an ethylcarbamoyl group, an octylcarbamoyl group, a pyrrolidinoacyl group, a p-ethylsulfonylphenylcarbamoyl group or a 2-methoxyethylcarbamoyl group), a sulfamido group (for example, a dimethylaminosulfonamido group, an anilinosulfonamido group or a decylaminosulfonamido group), or a halogen atom (for example, a chlorine atom or a fluorine atom) in view of color forming properties and other properties of the coupler. Of the groups represented by $X^3$, a cyano group and a sulfonyl group are particularly preferred.

It is preferred that r is 5 when $X^3$ is a fluorine atom, 2 or 3 when $X^3$ is a chlorine atom, and 1 or 2 when $X^3$ represents a group other than a halogen atom. When $X^3$ represents a cyano group, r is particularly preferably 1. The cyano group or sulfonyl group which is particularly preferred for $X^3$ is preferably present at at least one of the 2-position or 4-position to the ureido group, and it is particularly preferred to present at the 4-position when r is 1.

$R^3$ preferably represents an alkyl group (for example, a methyl group, a tert-octyl group, a 2-carboxyethyl group, a 2-(p-hydroxyphenylsulfonyl)ethyl group, a 2-methoxyethyl group, a benzyl group, a pentadecyl group or a 2-chloroethyl group), or an alkoxy group (for example, a methoxy group, a butoxy group, a 2-methoxyethoxy group, a 2-(p-hydroxyphenylsulfonyl-)ethoxy group, a phenoxy group or a 2-hydroxyethoxy group). s represents 0 or an integer of 1 to 4, more preferably 0 or an integer of 1 or 2, and particularly preferably 0.

$L_3$ has the same meaning as defined for $L_1$ in the general formula (I) and preferably represents a methyl group substituted with an electron attractive group (for example, a heterocyclic group, a carbamoyl group, an acyl group, a sulfonyl group or a sulfamoyl group) or a substituted phenyl group.

$L_4$ has the same meaning as defined for $L_2$ in the general formula (I) and preferably represents a substituted or unsubstituted alkyl group or a substituted or unsubstituted aryl group.

The group represented by the general formula (II) is connected to at least one of $L_3$, $L_4$, $X^3$ and $R^3$ of the cyan coupler represented by the general formula (III). It is preferred that the group of the general formula (II) is connected through Y or Z thereof to $L_3$, $L_4$ or $X^3$ of the cyan coupler of the general formula (III). When the group of the general formula (II) is connected to $L_4$ of the cyan coupler of the general formula (III), Y in the general formula (II) may simultaneously function as —CONH— in the general formula (III), or when the group of the general formula (II) is connected to $X^3$ of the cyan coupler of the general formula (III), Y or Z in the general formula (II) may simultaneously function as $X^3$ in the general formula (III).

The group represented by the general formula (II) is more preferably presented by the following general formula (IV):

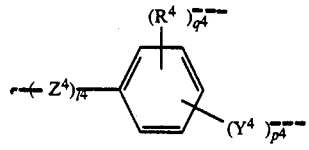

[IV]

wherein $Y^4$, $Z^4$ and $R^4$ have the same meanings as defined for Y, Z and $R^2$ in the general formula (II) respectively; $p^4$ represents an integer of 1 or 2; $q^4$ represents 0 or an integer of 1 to 4; and $l^4$ represents an integer of 1 to 3.

In more detail, $Y^4$ has the same meaning as defined for Y in the general formula (II) and preferably represents a sulfonyl group, a sulfamoyl group, an acyl group or a carbamoyl group. While $p^4$ represents an integer of 1 or 2, it is particularly preferred that $p^4$ is 1.

$Z^4$ has the same meaning as defined for Z in the general formula (II) and preferably represents a hydroxy group, a carbonamido group, a sulfonamido group or a sulfamido group. While $l^4$ represents an integer of 1 to 3, it is preferred that $l^4$ is an integer of 1 or 2 and particularly preferred that $l^4$ represents 1 when $Z^4$ represents a group other than the hydroxy group defined for $Z^4$.

$R^4$ has the same meaning as defined for $R^2$ in the general formula (II) and preferably represents a halogen atom (for example, a chlorine atom or a fluorine atom), an alkyl group (for example, a methyl group, an ethyl group, a butyl group, a 2-sulfoethyl group, a benzyl group, a 3-carboxypropyl group, a 2-acetamidoethyl group or a trifluoromethyl group), an alkoxy group (for example, a methoxy group, a butoxy group, a benzyloxy group, a 2-hydroxyethoxy group, a dodecyloxy group, a 2-sulfoethoxy group, a 2-methoxyethoxy group, a 3-carboxypropyloxy group, a 4-methoxyphenylmethoxy group or a 2-trichloroethoxy group), a carboxy group, a sulfo group or a cyano group. While $q^4$ represents 0 or an integer of 1 to 4, it is preferred that $q^4$ is 0 or an integer of 1 or 2, and particularly preferred that $q^4$ is 1 or 2 when $Z^4$ represents a hydroxy group, or 0 or 1 when $Z^4$ represents a group other than the hydroxy group defined for $Z^4$.

The group represented by the general formula (IV) is connected through $Y^4$, $Z^4$ or $R^4$, and preferably through $Y^4$ or $Z^4$, thereof to the cyan coupler represented by the general formula (I) and preferably to the cyan coupler represented by the general formula (III). It is preferred that $Z^4$ and $Y^4$ in the general formula (IV) are in an ortho position or para position with respect to each other and particularly in the para position.

When $Y^4$ or $Z^4$ of the group represented by the general formula (IV) is connected to $L_3$ of the cyan coupler represented by the general formula (III), $L_3$ represents an alkylene group, an arylene group, an aralkylene group, an alkenylene group or an aralkenylene group, and each of these groups may contain a hetero atom (for example, an ether bond, a thioether bond, an oxycarbonyl bond, a carbonamido bond, a sulfonamido bond, a ureido bond or an amino bond), therein, and $L_3$ is preferably an alkylene group, an aralkylene group or an arylene group and each of these groups may contain a hetero atom therein. A phenylene group is particularly preferred for $L_3$.

When $Y^4$ or $Z^4$ of the group represented by the general formula (IV) is connected to $L_4$ of the cyan coupler represented by the general formula (III), the carbamoyl group represented by $Y^4$ may simultaneously function as —CONH— in the general formula (III). $L_4$ represents an alkylene group, an arylene group, an aralkylene group, an alkenylene group or an aralkenylene group, and each of these groups may contain a bond with a hetero atom (for example, an ether bond, a thioether bond, an oxycarbonyl group, carbonamido group, a sulfonamido group, a sulfamido group or an amino group) therein, and $L_4$ is preferably an alkylene group, an arylene group or an aralkylene group and each of these groups may contain the bond with a hetero atom therein. An alkylene group containing an ether bond or an aralkylene group containing an ether bond is particularly preferred for $L_4$.

When $Y^4$ or $Z^4$ of the group represented by the general formula (IV) is connected to $X^3$ of the cyan coupler represented by the general formula (III), it is preferred that $Y^4$ or $Z^4$ in the general formula (IV) simultaneously functions as $X^3$ in the general formula (III), and particularly $Y^4$ is a sulfonyl group and simultaneously functions as $X^3$ in the general formula (III) or $Z^4$ is a sulfonamido group or a carbonamido group and simultaneously functions as a sulfamoyl group or a carbamoyl group for $X^3$ in the general formula (III).

Of the phenol series 2-equivalent cyan couplers represented by the general formula (III), those represented by the general formula (V) described below having at least one substituent represented by the above described general formula (II) are preferred.

[V]

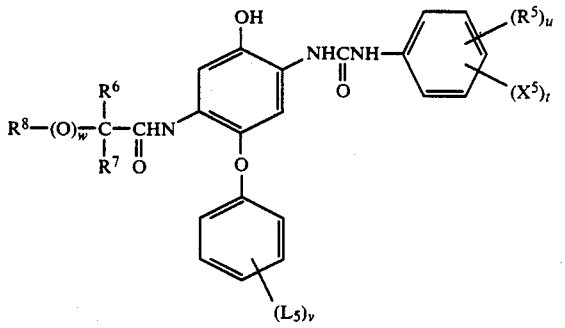

wherein $X^5$, $R^5$, t and u have the same meaning as defined for $X^3$, $R^3$, r and s in the general formula (III) respectively; $L_5$ represents a group represented by the general formula (IV), a halogen atom, an alkyl group, an alkoxy group, a carboxy group, a sulfo group, an acyl group, a carbamoyl group, a carbonamido group, a sulfamoyl group, a sulfonamido group, a sulfonyl group or a hydroxy group; $R^6$ and $R^7$ each represents a hydrogen atom, an alkyl group or an aryl group; $R^8$ represents an alkyl group or an aryl group, each of which may substituted with a group represented by the general formula (IV); v represents an integer of 1 to 5; and w represents 0 or an integer of 1.

The cyan color image forming coupler represented by the general formula (V) will be explained in detail below.

In the general formula (V), $L_5$ represents a group represented by the general formula (IV), a halogen atom (for example, a chlorine atom or a fluorine atom), an alkyl group (for example, a methyl group, a tert-amyl group, a tert-butyl group, a tert-octyl group or a pentadecyl group), an alkoxy group (for example, a methoxy group, an ethoxy group, a 2-methoxyethoxy group, a butoxy group, a 2-hydroxyethoxy group, a 3-carboxypropyloxy group, a 3-sulfopropyloxy group, a hexadecyloxy group or a benzyloxy group), a carboxy group, a sulfo group, an acyl group (for example, an acetyl group or a benzoyl group), a carbamoyl group (for example, a methylcarbamoyl group, a phenylcarbamoyl group, an octyl carbamoyl group or a dodecylcarbamoyl group), a carbonamido group (for example, an acetamido group, a butyramido group, a benzamido group or a decyramido group), a sulfamoyl group (for example, a dimethylsulfamoyl group, a phenylsulfamoyl group, a butylsulfamoyl group or an octadecylsulfamoyl group), a sulfonamido group (for example, a methylsulfonamido group, a phenylsulfonamido group, a decylsulfonamido group or a 4-decyloxyphenylsulfonamido group), a sulfonyl group (for example, a methylsulfonyl group, an ethylsulfonyl group, a phenylsulfonyl group, a hexadecylsulfonyl group or a p-dimethylaminophenylsulfonyl group) or a hydroxy group. Of these groups, a group represented by the general formula (IV), a halogen atom, an alkyl group, an alkoxy group, a sulfonamido group or a hydroxy group is particularly preferred for $L_5$. While v represents an integer of 1 to 5, it is preferred that v is an integer of 1 to 3, and particularly preferred that v is an integer of 1 or 2 and that at least one $L_5$ is present at the 4-position.

$R^6$ and $R^7$ each represents a hydrogen atom, an alkyl group (for example, a methyl group, an ethyl group, a butyl group, a hexyl group, a decyl group or a dodecyl group) or an aryl group (for example, a phenyl group, a 4-methoxyphenyl group or a 4-methylphenyl group).

$R^8$ represents a phenyl group or alkyl group substituted with a group represented by the general formula (IV), an aryl group (for example, a 2,4-di-tert-amylphenyl group, a 3-pentadecylphenyl group, a 2,4-di-tert-octylphenyl group, a 2-chloro-4-tert-amylphenyl group, a 4-hydroxy-3-tert-octylphenyl group or a 4-cyano-2-tert-octylphenyl group) or an alkyl group (for example, a methyl group, an ethyl group, a 2-methoxyethyl group, a dodecyl group or a tetradecyl group). w represents 0 or 1. When w is 0, $R^8$ may be the group represented by the general formula (IV). When $R^8$ is the group represented by general formula (IV), it is particularly preferred that $Y^4$ in the general formula (IV) is a sulfonyl group and the sulfonyl group is connected to the carbon atom on which $R^6$ and $R^7$ are substituted in the general formula (V).

To the phenol series cyan coupler represented by the general formula (V) at least one of the groups represented by the general formula (II), and preferably one of the groups represented by the general formula (IV), is connected. The group is connected to $L_5$, $R^8$ or $X^5$ in the general formula (V) and, as described above, $L_5$,$R^8$ or $X^5$ may simultaneously function as the group represented by the general formula (II), more preferably the group represented by the general formula (IV).

The phenol series 2-equivalent cyan coupler represented by the general formula (I), (III) or (V) described above according to the present invention (hereinafter referred to as a coupler according to the present invention) is characterized by an arylureido group substituted with the specified group (preferably a phenylureido group) at the 2-position, a group capable of being released with an oxygen atom at the 4-position and an acylamino group at the 5-position of the phenol and further at least one of the groups represented by the general formula (II) or (IV). It is considered that the fulfillment of these conditions provides various preferred properties.

More specifically, since the colorless 2-equivalent cyan coupler of the present invention is excellent in color forming property and can provide a very high sensitivity, gradation, and maximum density, the coupler of the present invention can reduce the amount of silver halide contained in a photographic emulsion as well and is suitable for not only ordinary photographic processing, but also rapid photographic processing. Furthermore, the coupler of the present invention is excellent in solubility in an organic solvent having a high boiling point and dispersing stability in a photographic emulsion, and does not form fog or color stain in the photographic emulsion layer, when the coupler is used for a silver halide photographic emulsion layer. Also, the dye obtained from the cyan coupler of the present invention has excellent fastness to light, heat, and humidity, does not have undesirable light absorption, shows a sharp absorption, and has good spectral absorption characteristics. Moreover, the coupler of the present invention does not show any substantial reduction of the color density even for the case of processing the color photographic material containing the coupler in a bleaching solution having a weak oxidation powder or an exhausted bleaching solution.

The effects obtained by the couplers of the present invention are astonishingly excellent when compared to the 2-equivalent couplers described in above-described U.S. Pat. No. 4,333,999, Japanese Patent Application (OPI) Nos. 204543/82, 204544/82, 204545/82, 33249/83, 33250/83, 33251/83, 33252/83, 42045/83, 189636/83, 34536/84, 105644/84, 111644/84, 121330/84 and 121331/84.

Specific examples of the couplers according to the present invention are illustrated below, but the present invention should not be construed as being limited to these compounds.

These specific examples are described based on the designated groups for X, Y and R in the following general formula:

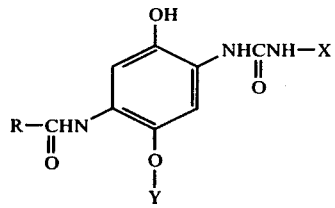
| Compound No. | X | Y | R |
|---|---|---|---|
| (1) | 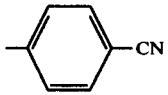 | 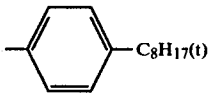 | 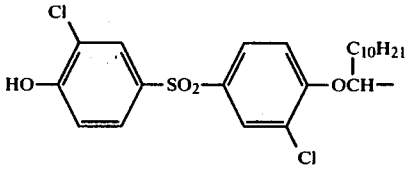 |
| (2) | 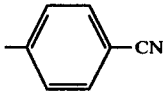 | 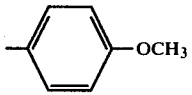 | 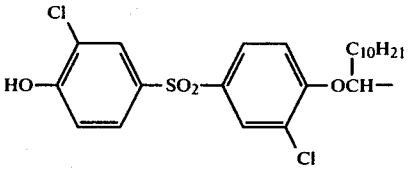 |
| (3) | 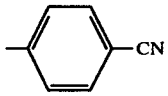 | 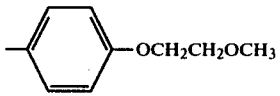 | 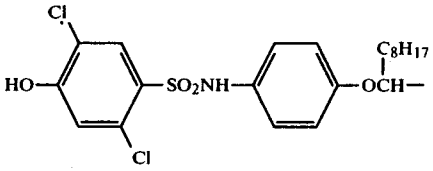 |
| (4) | 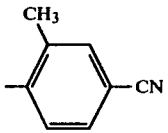 | 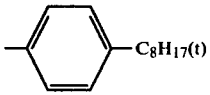 | 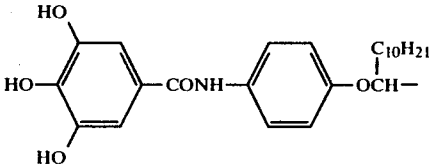 |

-continued
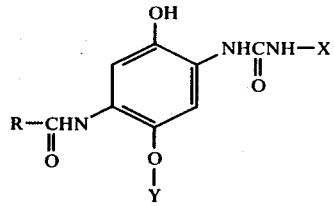
| Compound No. | X | Y | R |
|---|---|---|---|
| (5) | 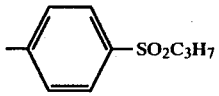  | 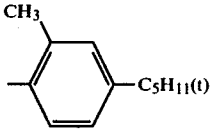  | 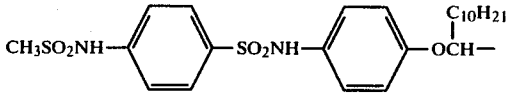  |
| (6) | 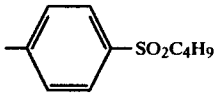  | 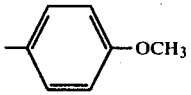  | 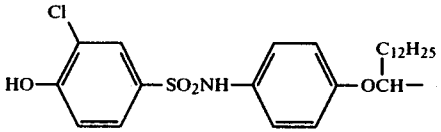  |
| (7) | 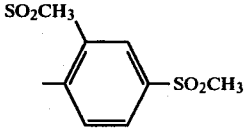  | 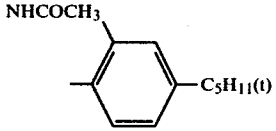  | 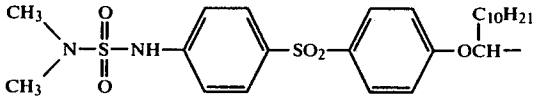  |
| (8) | 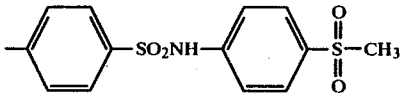  | 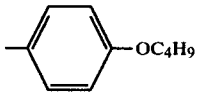  | 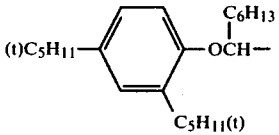  |
| (9) | 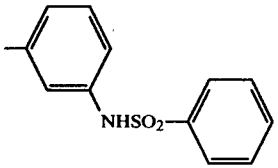  | 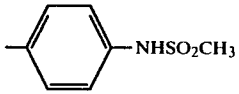  | 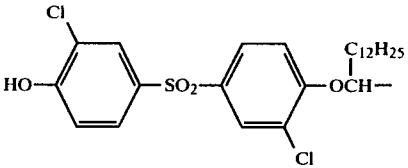  |

-continued
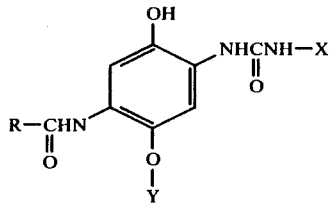
| Compound No. | X | Y | R |
|---|---|---|---|
| (10) | 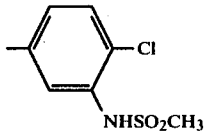 | 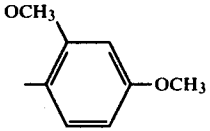 | 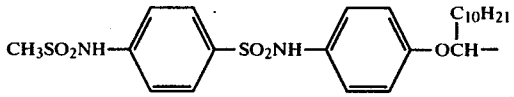 |
| (11) | 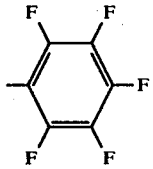 | 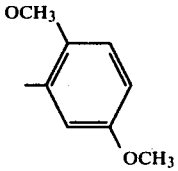 | 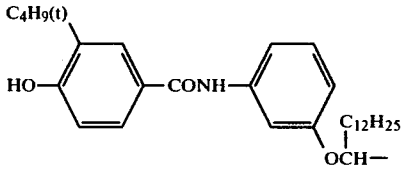 |
| (12) | 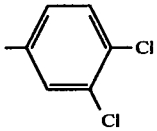 | 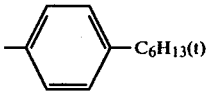 | 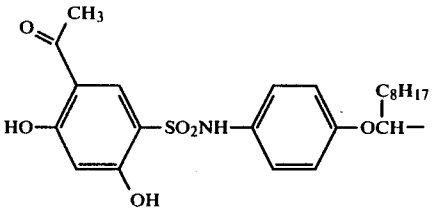 |
| (13) | 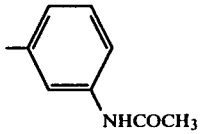 | 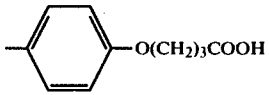 | 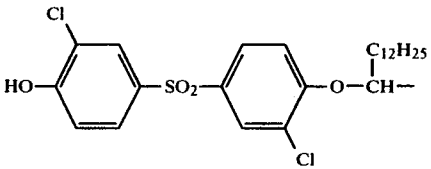 |

-continued
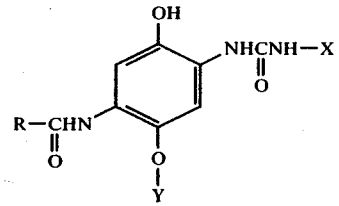
| Compound No. | X | Y | R |
|---|---|---|---|
| (14) | 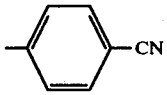 | 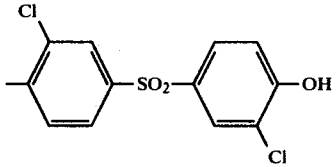 | 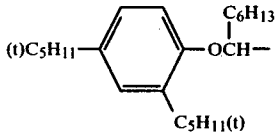 |
| (15) | 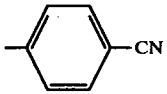 | 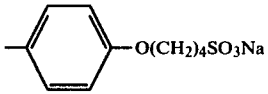 | 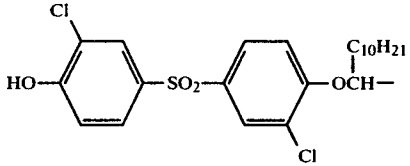 |
| (16) | 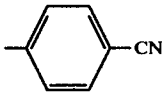 | 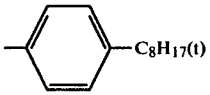 | 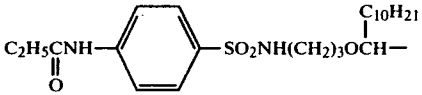 |
| (17) | 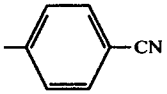 | 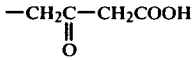 | 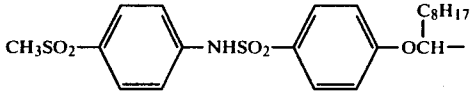 |
| (18) | 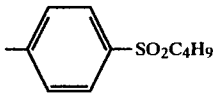 | 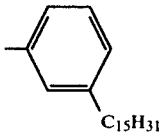 | 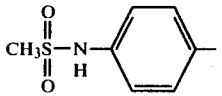 |

-continued
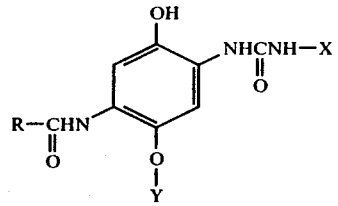
| Compound No. | X | Y | R |
|---|---|---|---|
| (19) | 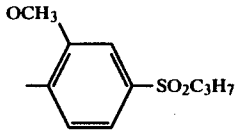 | 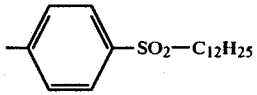 | 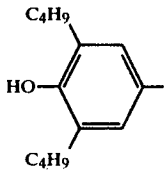 |
| (20) | 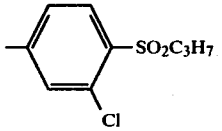 | 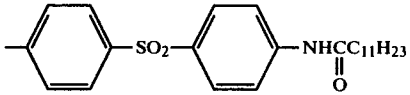 | 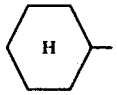 |
| (21) | 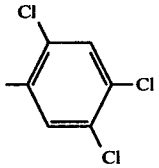 | 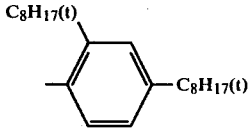 | 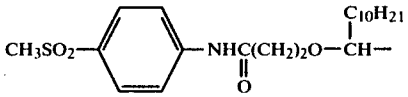 |
| (22) | 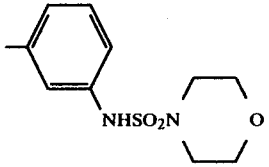 | 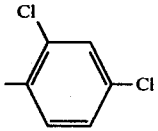 | 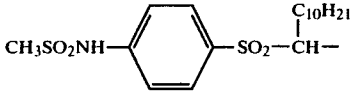 |

-continued
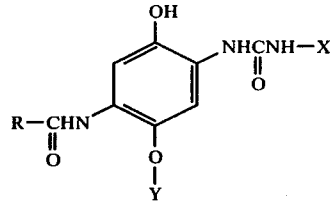
| Compound No. | X | Y | R |
|---|---|---|---|
| (23) | 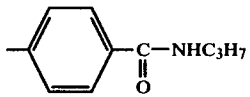 | 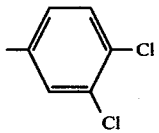 | 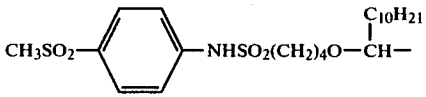 |
| (24) | 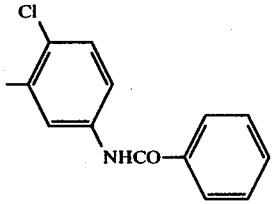 | 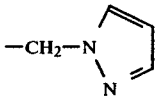 | 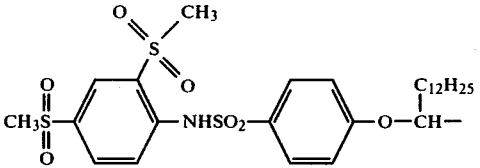 |
| (25) | 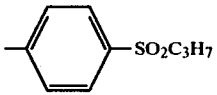 | 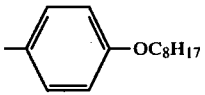 | 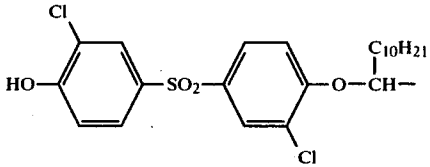 |
| (26) | 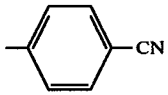 | 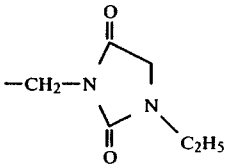 | 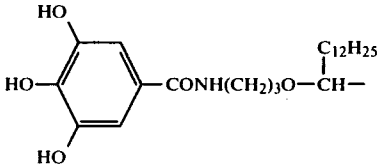 |

-continued
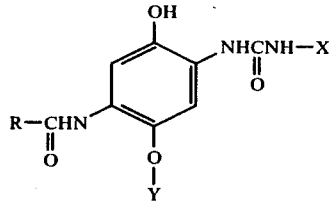
| Compound No. | X | Y | R |
|---|---|---|---|
| (27) | 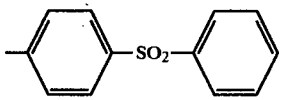 | 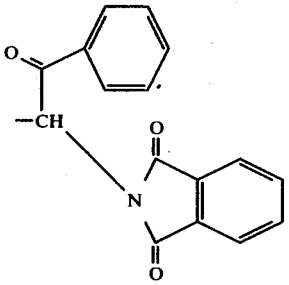 | 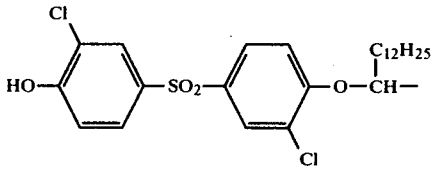 |
| (28) | 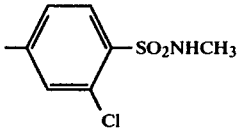 | 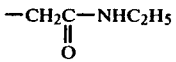 | 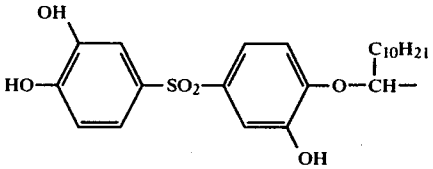 |
| (29) | 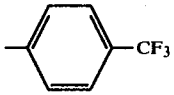 | 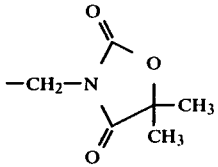 | 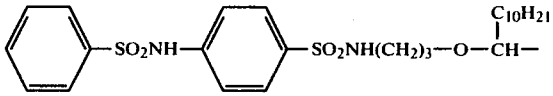 |
| (30) | 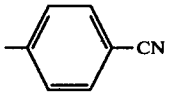 | 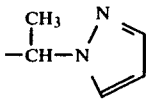 | 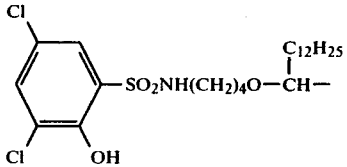 |

-continued
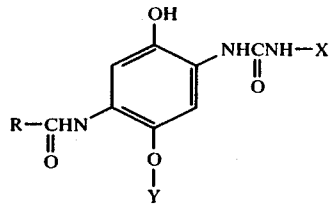
| Compound No. | X | Y | R |
|---|---|---|---|
| (31) | 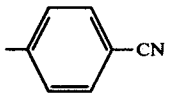 | 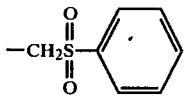 | 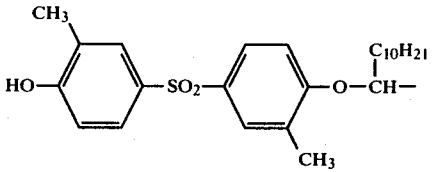 |
| (32) | 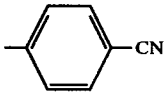 | 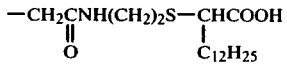 | 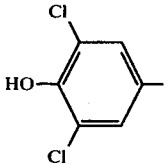 |
| (33) | 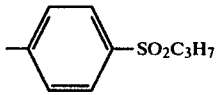 | 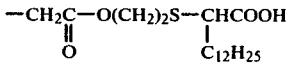 | 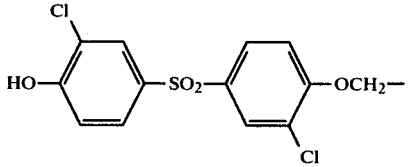 |
| (34) | 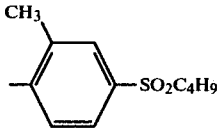 | 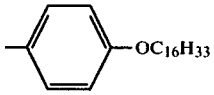 | 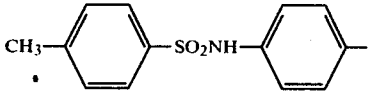 |
| (35) | 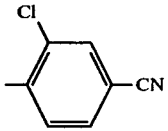 | 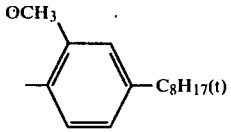 | 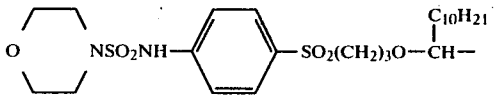 |

-continued
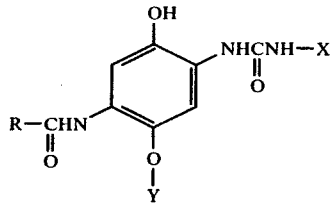
| Compound No. | X | Y | R |
|---|---|---|---|
| (36) | 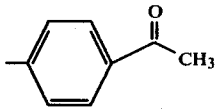 | 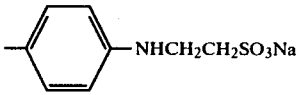 | 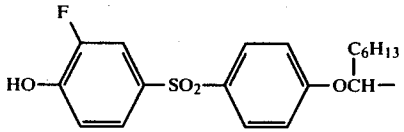 |
| (37) | 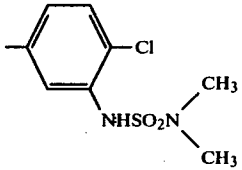 | 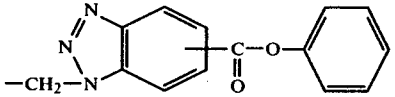 | 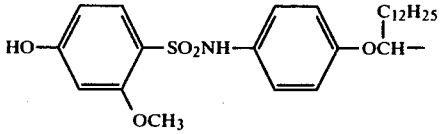 |
| (38) | 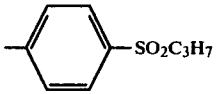 | 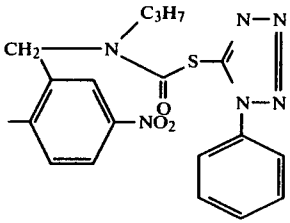 | 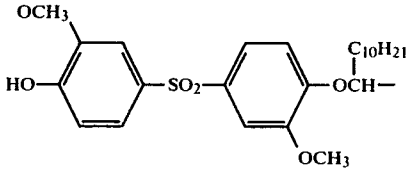 |
| (39) | 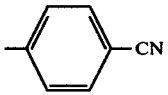 | 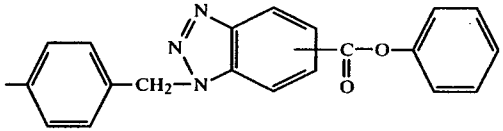 | 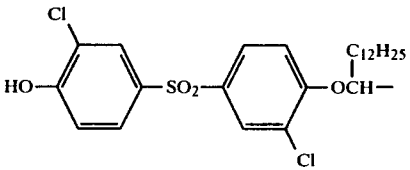 |

-continued
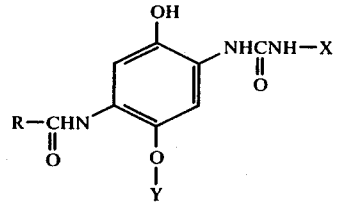
| Compound No. | X | Y | R |
|---|---|---|---|
| (40) | 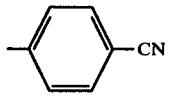 | 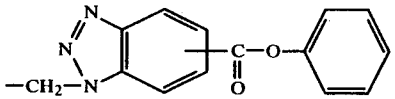 | 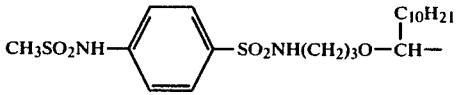 |
| (41) | 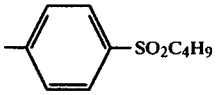 | 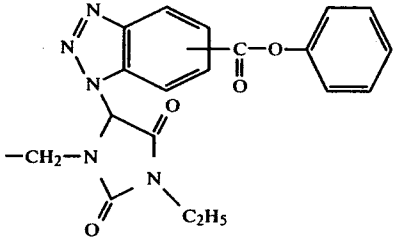 | 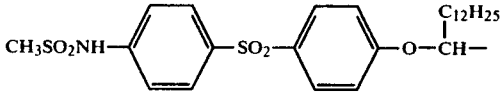 |
| (42) | 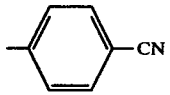 | 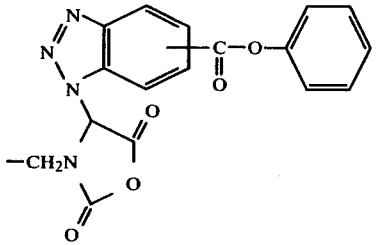 | 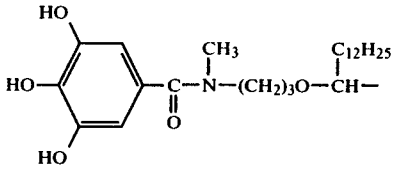 |
| (43) | 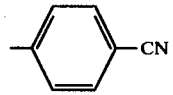 | 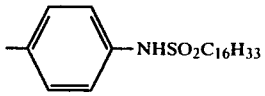 | 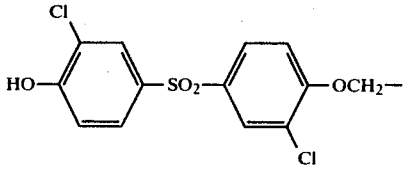 |

-continued
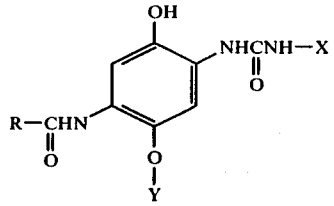
| Compound No. | X | Y | R |
|---|---|---|---|
| (44) | 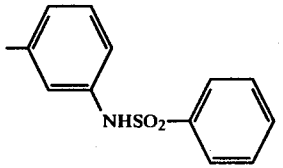 | 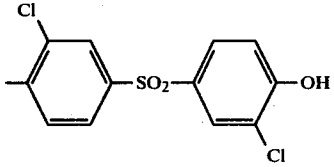 | 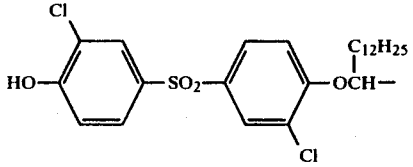 |
| (45) | 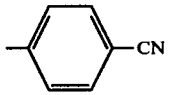 | 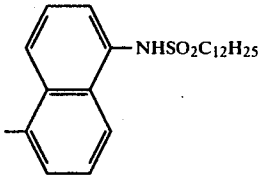 | 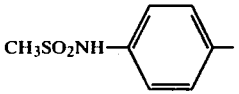 |
| (46) | 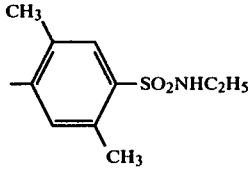 | 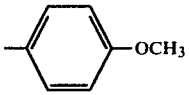 | 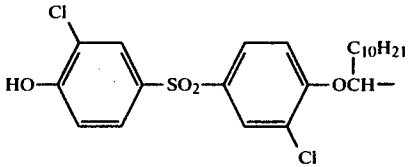 |
| (47) | 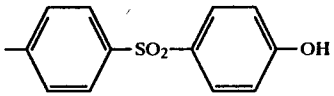 | 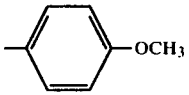 | 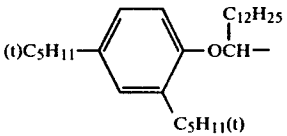 |

-continued
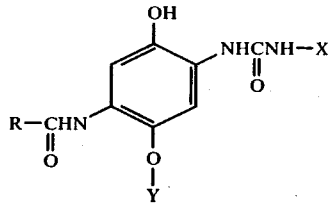
| Compound No. | X | Y | R |
|---|---|---|---|
| (48) | 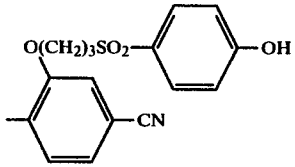 | 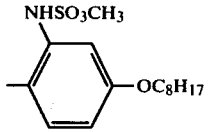 | 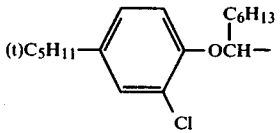 |
| (49) | 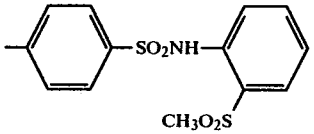 | 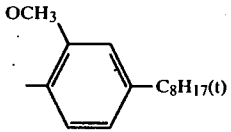 | 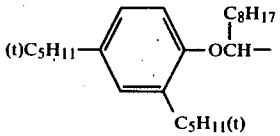 |
| (50) | 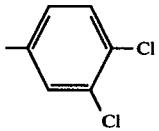 | 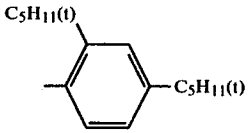 | 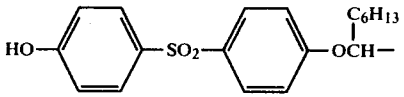 |
| (51) | 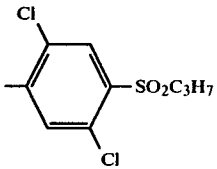 | 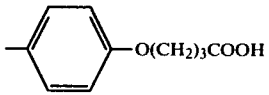 | 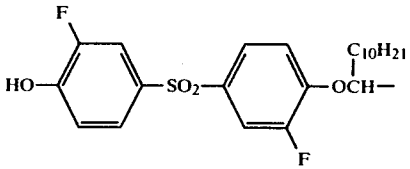 |

-continued
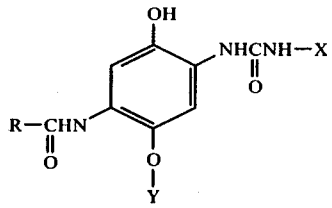
| Compound No. | X | Y | R |
|---|---|---|---|
| (52) | 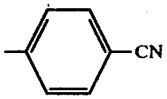 | 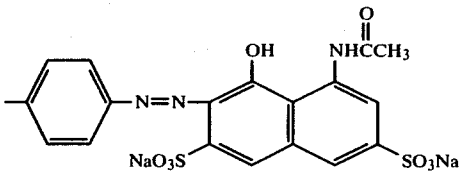 | 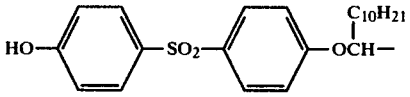 |
| (53) | 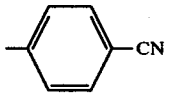 | 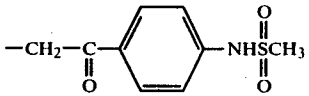 | 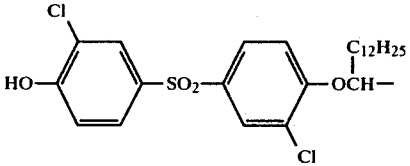 |
| (54) | 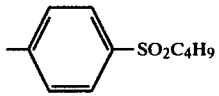 | $-CH_2CNHCH_2CH_2COOH$ (O) | 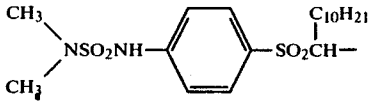 |
| (55) | 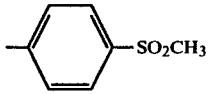 | 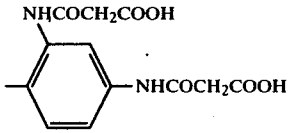 | 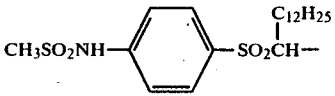 |

The couplers of the present invention can be easily synthesized with reference to the syntheses methods for phenol series 2-equivalent cyan couplers of the oxygen-releasing type and intermediates thereof as described in U.S. Pat. No. 3,880,661, Japanese Patent Application (OPI) Nos. 35731/85, 49335/85 and 49336/85, Japanese Patent Application Nos. 123505/84 and 122460/84.

Specific syntheses examples are shown in the following.

SYNTHESIS EXAMPLE 1

Synthesis of Coupler (1)

To 120 ml of an N,N-dimethylacetamide solution containing 23.6 g (0.05 mol) of 5-amino-2-(4-cyanophenylureido)-4-(4-tert-octylphenoxy)phenol was added dropwise to 100 ml of an N,N-dimethylacetamide solution containing 31 g (0.05 mol) of 2-[4-(3-chloro-4-benzyloxyphenylsulfonyl)-2-chlorophenoxy]dodecyroyl chloride at room temperature over a period of about 20 minutes under nitrogen atmosphere. The reaction solution was allowed to stand overnight and then 400 ml of water and 200 ml of ethyl acetate were added thereto. The ethyl acetate layer was separated, dried and concentrated to obtain the crude oily product. The oily product was separated and purified using silica gel chromatography to obtain 32.2 g (yield: 62%) of the benzyl derivative of Coupler (1). Melting point: 179° to 183° C.

To 330 ml of a methylene chloride solution containing 17.1 g (0.016 mol) of the benzyl derivative thus obtained was added dropwise 30 ml of a methylene chloride solution containing 7.1 g (1.7 equiv.) of boron tribromide while cooling with ice and the mixture was further stirred for 1 hour. The reaction solution was poured into 400 ml of ice water and extracted with 300 ml of ethyl acetate. The extract was dried with sodium sulfate and the solvent was distilled off to obtain the crude crystals. The crystals were recrystallized from a solvent mixture of ethyl acetate and n-hexane to obtain 11.0 g (yield: 70%) of Coupler (1). Melting point: 151° to 156° C.

SYNTHESIS EXAMPLE 2

Synthesis of Coupler (14)

200 ml of a tetrahydrofuran solution containing 19.6 g (0.1 mol) of 5-fluoro-2-methyl-6-nitrobenzoxazole was added dropwise to 400 ml of a tetrahydrofuran solution containing a phenoxide prepared from 40.9 g (0.1 mol) of 4-(4-benzyloxy-3-chlorophenylsulfonyl)-2-chlorophenol and 4.4 g (0.11 mol) of 60% sodium hydride and the mixture was reacted at 35° C. for 2 hours. The tetrahydrofuran was distilled off under a reduced pressure and to the residue was added ethanol to crystallize 44 g of the crude crystals of 5-[4-(4-benzyloxy-3-chlorophenylsulfonyl)-2-chlorophenoxy]-2-methyl-6-nitrobenzoxazole.

29.3 g (0.05 mol) of the crude crystals thus obtained was added to a mixture of 20 ml of concentrated hydrochloric acid (12 N) and 200 ml of ethanol and the mixture was reacted at 70° C. for 5 hours. The reaction solution was poured into 1000 ml of water and the yellowish brown colored crystals thus-precipitated were collected by filtration to obtain 24.1 g of 2-amino-4-[4-(4-benzyloxy-3-chlorophenylsulfonyl)-2-chlorophenoxy]-5-nitrophenol. Melting point: 181° to 184° C.

22.4 g (0.04 mol) of the amino phenol compound thus obtained was added to 300 ml of acetonitrile, to which was added 9.5 g (0.04 mol) of N-phenoxycarbonyl-4-cyanoaniline at 50° C. to 60° C. and the mixture was refluxed by heating for 2 hours. To the reaction solution was added 400 ml of water, and the mixture was extracted with 400 ml of ethyl acetate. The extract was dried with sodium sulfate and the solvent was distilled off to obtain 19.7 g of the ureido compound.

17.6 g (0.025 mol) of the ureido compound thus obtained and 2 g of palladium-carbon catalyst were added to 100 ml of N,N-dimethylacetamide and the mixture was subjected to catalytic reduction at 50° C. at 2.0 atm. in an autoclave. After removing the catalyst by filtration, to the filtrate was added 10.9 g (0.027 mol) of 2-(2,4-di-tert-amylphenoxy)octanoyl chloride and the mixture was stirred at 50° C. for about 2 hours. The reaction solution was poured into 300 ml of water and extracted with 400 ml of ethyl acetate. The extract was washed twice with an aqueous sodium hydrosulfite solution and dried with sodium sulfate. The ethyl acetate was distilled off to obtain the crude oily product which was then separated using silica gel chromatography to obtain 16.2 g of Coupler (14). Melting point: 172° to 176° C.

Various color couplers other than the cyan couplers of the present invention can be employed in the present invention. The term "color couplers" as used herein refers to compounds capable of forming dyes upon reaction with the oxidation products of aromatic primary amine developing agents. Typical examples of useful color couplers include naphthol or phenol type compounds, pyrazolone or pyrazoloazole type compounds and open-chain or heterocyclic ketomethylene type compounds. Specific examples of utilizable cyan, magenta and yellow couplers are described in the patents cited in *Research Disclosure*, No. 17643, VII-D (December, 1978) and *Research Disclosure*, No. 18717 (November, 1979).

It is preferable that these couplers which are incorporated into photographic materials are rendered diffusion-resistant by means of a ballast group or polymerization. It is also preferred that the coupling active position of these couplers is substituted with a group capable of being released (two-equivalent couplers) rather than with a hydrogen atom (four-equivalent couplers). Further, couplers which form dyes having an appropriate diffusibility, non-color forming couplers, or couplers capable of releasing development inhibitors (DIR couplers) or development accelerators accompanying the coupling reaction can be employed.

As typical yellow couplers used in the present invention, oil protected acylacetamide type couplers include those described in U.S. Pat. Nos. 2,407,210, 2,875,057 and 3,265,506. In the present invention, two-equivalent yellow couplers are preferably employed and typical examples thereof include yellow couplers of the oxygen atom releasing type as described in U.S. Pat. Nos. 3,408,194, 3,447,928, 3,933,501 and 4,022,620, and yellow couplers of the nitrogen atom releasing type as described in Japanese Patent Publication No. 10739/83, U.S. Pat. Nos. 4,401,752 and 4,326,024, *Research Disclosure*, No. 18053 (April, 1979), British Pat. No. 1,425,020, West German Patent Application (OLS) Nos. 2,219,917, 2,261,361, 2,329,587 and 2,433,812. α-Pivaloylacetanilide type couplers are characterized by fastness, particularly light fastness, of dyes formed, and α-benzylacetanilide type couplers are characterized by their good color forming properties.

As magenta couplers used in the present invention, oil protected indazolone type couplers, cyanoacetyl type couplers, and preferably 5-pyrazolone type couplers and pyrazoloazole type couplers such as pyrazolotriazoles are exemplified. Of 5-pyrazolone type couplers, those substituted with an arylamino group or an acylamino group at the 3-position thereof are preferred in view of hue of dyes formed and color forming properties. Typical examples thereof are described in U.S. Pat. Nos. 2,311,082, 2,343,703, 2,600,788, 2,908,573, 3,062,653, 3,152,896 and 3,926,015. Two-equivalent 5-pyrazolone type couplers are preferably used since high color density and high sensitivity are obtained with a small amount of coated silver, and nitrogen atom releasing groups as described in U.S. Pat. No. 4,310,619 and arylthio groups as described in U.S. Pat. No. 4,351,897 are preferred as releasing groups. Further, 5-pyrazolone type couplers having a ballast group as described in European Pat. No. 73,636 are advantageous because of their high color forming reactivities.

Examples of pyrazoloazole type couplers include pyrazolobenzimidazoles as described in U.S. Pat. No. 3,369,897, and preferably pyrazolo[5,1-c][,1,2,4]triazoles as described in U.S. Pat. No. 3,725,067, pyrazolotetrazoles as described in *Research Disclosure,* No. 24220 (June, 1984) and pyrazolopyrazoles as described in *Research Disclosure,* No. 24230 (June, 1984). Imidazo[1,2-b]pyrazoles as described in European Pat. No. 119,741 are preferred and pyrazolo[1,5-b][1,2,4]triazoles as described in European Pat. No. 119,860 are particularly preferred in view of limited yellow subsidiary absorption and the light fastness of dyes formed.

As cyan couplers used in the present invention, oil protected naphthol type and phenol type couplers include naphthol type couplers as described in U.S. Pat. No. 2,474,293 and preferably oxygen atom releasing type two-equivalent naphthol type couplers as described in U.S. Pat. Nos. 4,052,212, 4,146,396, 4,228,233 and 4,296,200. Specific examples of phenol type couplers are described in U.S. Pat. Nos. 2,369,929, 2,801,171, 2,772,162 and 2,895,826.

Cyan couplers fast to humidity and temperature are preferably used in the present invention. Typical examples thereof include phenol type cyan couplers as described in U.S. Pat. No. 3,772,002, 2,5-diacylamino-substituted phenol type couplers as described in U.S. Pat. Nos. 2,772,162, 3,758,308, 4,126,396, 4,334,011 and 4,327,173, West German Patent Application (OLS) No. 3,329,729, and Japanese Patent Application No. 42671/83, and phenol type couplers substituted with a phenylureido group at the 2-position thereof and an acylamino group at the 5-position thereof as described in U.S. Pat. Nos. 3,446,622, 4,333,999, 4,451,559 and 4,427,767.

The dye forming couplers are employed in an amount of about 0.002 mol to 0.5 mol per mol of light-sensitive silver halide contained in a photosensitive layer to be added. In cases of color photographic materials for photographing, typical amounts of yellow couplers, magenta couplers and cyan couplers used are in ranges of about 0.01 mol to 0.5 mol, about 0.003 mol to 0.25 mol and about 0.002 mol to 0.12 mol per mol of light-sensitive silver halide, respectively. Further in color photographic materials for printng such as color paper, typically each of yellow, magenta and cyan couplers is used in a range of about 0.1 mol to 0.5 mol per mol of light-sensitive silver halide. However, it is also possible to produce photographic materials using amounts of the couplers outside of such ranges.

Two or more kinds of couplers of the present invention and couplers described above can be incorporated together in the same layer to provide the properties required in the photographic materials, or the same compound can be added to two or more different layers.

It is preferred to use colored couplers together with the above dye forming couplers in color photographic materials for photographing in order to correct undesirable absorptions in shorter wavelength regions which dyes formed from magenta couplers and cyan couplers used have. Typical examples include yellow-colored magenta couplers as described in U.S. Pat. No. 4,163,670 and Japanese Patent Publication No. 39413/82, and magenta-colored cyan couplers as described in U.S. Pat. Nos. 4,004,929 and 4,138,258 and British Pat. No. 1,146,368.

These color couplers described above may be used in the form of bis-couplers or polymer couplers. Typical examples of polymer couplers are described in U.S. Pat. Nos. 3,451,820 and 4,080,211. Specific examples of magenta polymer couplers are described in British Pat. No. 2,102,173 and U.S. Pat. No. 4,367,282.

Further, couplers capable of forming diffusible dyes can be used in photographic materials according to the invention in order to improve graininess. Specific examples of such magenta couplers are described in U.S. Pat. No. 4,366,237 and British Pat. No. 2,125,570 and such yellow, magenta and cyan couplers are described in European Pat. No. 96,873 and West German Patent Application (OLS) No. 3,324,533.

As DIR couplers used in the present invention, those which release a heterocyclic mercapto type development inhibitor as described in U.S. Pat. No. 3,227,554, those which release a benzotriazole derivative as a development inhibitor as described in Japanese Patent Publication No. 9942/83, "non-color forming" DIR couplers as described in Japanese Patent Publication No. 16141/76, those which release a nitrogen-containing heterocyclic development inhibitor upon decomposition of methylol after cleavage as described in Japanese Patent Application (OPI) No. 90932/77; those which release a development inhibitor upon intramolecular nucleophilic reaction after cleavage as described in U.S. Pat. No. 4,248,962, those which release a development inhibitor upon electron transfer via a conjugated system after cleavage as described in Japanese Patent Application (OPI) Nos. 114946/81, 56837/82, 154234/82, 188035/82, 98728/83, 209736/83, 209737/83, 209738/83 and 209740/83, those which release a diffusible development inhibitor which deactivate its development inhibiting function in a developing solution as described in Japanese Patent Application (OPI) Nos. 151944/82 and 217932/83, and those which release a reactive compound which reacts in a layer during development to form a development inhibitor or to deactivate a development inhibitor as described in Japanese Patent Application Nos. 38263/84 and 29653/84, are exemplified. Of these DIR couplers described above, those of deactivation type in a developing solution as represented by Japanese Patent Application (OPI) No. 151944/82, those of timing type as represented by U.S. Pat. No. 4,248,962 and Japanese Patent Application (OPI) No. 154234/82 and those of reactive type as represented by Japanese Patent Application No. 39653/84 are preferably used in combination with the couplers of the present invention. Further, DIR couplers of deactivation type in a developing solution such as those described in Japanese Patent Application (OPI) No. 151944, and DIR couplers of reactive type as described in Japanese Patent Application No. 39653/84 are particularly preferred.

Compounds which release a development inhibitor as development proceeds other than DIR couplers may be incorporated into the photographic materials. For example, those described in U.S. Pat. Nos. 3,297,445 and 3,379,529, West German Patent Application (OLS) No. 2,417,914, Japanese Patent Application No. 15271/77, and Japanese Patent Application (OPI) No. 9116/78 can be used.

Further, compounds which release a reducing agent or a fogging agent as development proceeds may be incorporated into the photographic materials. For example, those which release a hydroquinone or an aminophenol as described in U.S. Pat. No. 3,408,194, Japanese Patent Application (OPI) No. 138636/82, and Japanese Patent Application No. 33059/84, and those which release a fogging agent as described in Japanese Patent Application (OPI) Nos. 150845/82 and 50439/84, and Japanese Patent Application (OPI) Nos. 170840/84 and 157638/84, can be used.

The couplers of the present invention are used in an amount of about 0.002 mol to 0.5 mol per mol of light-sensitive silver halide in a layer to be incorporated in order to achieve the purposes of the present invention.

The couplers of to the present invention and other couplers which may be employed together in the present invention described above can be incorporated into photographic materials using various known dispersing methods. Typical examples of methods which can be used include a solid dispersing method, an alkali dispersing method, preferably a latex dispersing method and more preferably an oil droplet in water type dispersing method. By means of the oil droplet in water type dispersing method, compounds are dissolved in either an organic solvent having a high boiling point of 175° C. or more, an auxiliary solvent having a low boiling point, or a mixture thereof and then the solution is finely dispersed in an aqueous medium such as water or an aqueous gelatin solution, in the presence of a surface active agent. Specific examples of suitable organic solvents having a high boiling point are described in U.S. Pat. No. 2,322,027. In order to prepare the dispersion, phase inversion may be used. Further, dispersion are utilized for coating after optionally removing or reducing the auxiliary solvent therein by distillation, noodle washing or ultrafiltration.

Specific examples of the organic solvent having a high boiling point include phthalic acid esters (for example, dibutyl phthalate, dicyclohexyl phthalate, di-2-ethylhexyl phthalate, and didodecyl phthalate), phosphoric or phosphonic acid esters (for example, triphenyl phosphate, tricresyl phosphate, 2-ethylhexyl diphenyl phosphate, tricyclohexyl phosphate, tri-2-ethylhexyl phosphate, tridecyl phosphate, tributoxyethyl phosphate, trichloropropyl phosphate, and di-2-ethylhexyl phenyl phosphonate), benzoic acid esters (for example, 2-ethylhexyl benzoate, dodecyl benzoate and 2-ethylhexyl-p-hydroxybenzoate), amides (for example, diethyldodecanamide, and N-tetradecylpyrrolidone), alcohols or phenols (for example, isostearyl alcohol and 2,4-di-tert-amylphenol), aliphatic carboxylic acid esters (for example, dioctyl azelate, glycerol tributyrate, isostearyl lactate and trioctyl citrate), aniline derivatives (for example, N,N-dibutyl-2-butoxy-5-tert-octylaniline), and hydrocarbons (for example, paraffin, dodecylbenzene, and diisopropylnaphthalene). As the auxiliary solvents, organic solvents having a boiling point of from about 30° C. to about 160° C. can be used. Typical examples of such auxiliary solvents include ethyl acetate, butyl acetate, ethyl propionate, methyl ethyl ketone, cyclohexanone, 2-ethoxyethyl acetate, dimethylformamide, etc.

The processes and effects of latex dispersing methods and the specific examples of latexes for loading are described in U.S. Pat. No. 4,199,363, West German Patent Application (OLS) Nos. 3,541,274 and 2,541,230.

For the photographic emulsion layers of the photographic materials used in the present invention, any of silver bromide, silver iodobromide, silver iodochlorobromide, silver chlorobromide and silver chloride can be employed as the silver halide. Preferable silver halides are silver iodobromides containing 15 mol % or less of iodide. Particularly preferred silver halides are silver iodobromides containing 2 to 12 mol % of silver iodide.

Silver halide grains in the photographic emulsion may have a regular crystal form such as a cube, an octahedron or a tetradecahedron, an irregular crystal form such as that of a sphere, or a composite form thereof.

Further, photographic emulsions wherein at least about 50% of the total projected area of silver halide particles is tabular silver halide particles having a thickness of about 0.5 microns or less, the diameter of about 0.6 microns or more and an average aspect ratio of about 5 or more as described in *Research Disclosure* No. 22534 may be used.

Silver halide of uniform crystal structure, silver halide having a different composition in the inner portions and outer portions of the grain, silver halide having a layer structure, silver halide combined with silver halide having a different composition of epitaxial combination, or silver halide composed of a mixture of various crystal forms may be used.

Further, silver halide particles in which latent images are formed mainly on the surface thereof or those in which latent images are formed mainly in the interior thereof may be used.

The particle size of silver halide can be varied from fine grains of a diameter of about 0.1 micron or less to large grains having a diameter of up to about 3 microns calculated from projected areas. Also, monodisperse emulsions having a narrow distribution of grain sizes or polydisperse emulsion having a broad distribution may be used.

The photographic silver halide emulsions which are used in the present invention can be prepared by the methods as described in P. Glafkides, *Chimie et Physique Photographique* (Paul Montel Co., 1967), G. F. Duffin, *Photographic Emulsion Chemistry* (The Focal Press, 1966), V. L. Zelikman et al., *Making and Coating Photographic Emulsion* (The Focal Press, 1964). That is, the silver halide emulsions may be prepared by an acid method, a neutral method, an ammonia method, or other conventional method, and the reaction of a soluble silver salt and a soluble halide may be performed by a single jet process, a double jet process, or a combination of these processes.

A process in which silver halide particles are formed in the presence of an excess amount of silver ions (the "reversal mixing" process) can also be used. In one typically used double jet process, the pAg of the liquid phase where the silver halide is formed is kept at a constant value (the "controlled double jet" process). According to this process, a silver halide emulsion having a regular crystal form and almost uniform grain size is obtained.

Moreover, two or more silver halide emulsions prepared separately may be used as a mixture thereof.

The formation of silver halide particles or the physical ripening of silver halide particles can be performed in the presence of a cadmium salt, a zinc salt, a lead salt, a thallium salt, an iridium salt or a complex salt thereof, a rhodium salt or a complex salt thereof, an iron salt or a complex salt thereof.

The silver halide emulsions are usually chemically sensitized. In order to carry out chemical sensitization, it is possible to use the processes as described in H. Frieser (ed.), *Die Grundlagen der Photographischen Prozesse mit Silberhalogeniden,* pages 675 to 734 (Akademische Verlagsgesellschaft, 1968).

Namely, it is possible to use a sulfur sensitization process using active gelatin or sulfur containing compounds capable of reacting with silver (for example, thiosulfates, thioureas, mercapto compounds or rhodanines), a reduction sensitization process using reducing substances (for example, stannous salts, amines, hydrazine derivatives, formamidinesulfinic acid or silane compounds) and a noble metal sensitization process using noble metal compounds (for example, gold complex salt and complex salts of metals belonging to Group VIII in the Periodic Table, such as Pt, Ir or Pd), which may be used alone or in combination.

The photographic emulsion used in the present invention may include various compounds for the purpose of preventing fog formation or of stabilizing photographic performance in the photographic material during the production, storage or photographic processing thereof. For example, antifoggants or stabilizers can be incorporated, including azoles such as benzothiazolium salts, nitroimidazoles, nitrobenzimidazoles, chlorobenzimidazoles, bromobenzimidazoles, mercaptothiazoles, mercaptobenzothiazoles, mercaptobenimidazoles, mercaptothiadiazoles, aminotriazoles, benzotriazoles, nitrobenzotriazoles, or mercaptotetrazoles (particularly 1-phenyl-5-mercaptotetrazole); mercaptopyrimidines; mercaptotriazines; thioketo compounds such as oxazolinethione; azaindenes such as triazaindenes, tetraazaindenes (particularly 4-hydroxy-substituted (1,3,3a,7)-tetraazaindenes) or pentaazaindenes; benzenethiosulfonic acids; benzenesulfinic acids; or benzenesulfonic amides.

The photographic emulsion layer of the photographic material of the present invention may contain compounds such as polyalkylene oxide or its ether, ester, amine or like derivatives, thioether compounds, thiomorpholines, quaternary ammonium salt compounds, urethane derivatives, urea derivatives, imidazole derivatives, and 3-pyrazolidones for the purpose of increasing sensitivity or contrast, or of accelerating development.

In the photographic emulsion layer or other hydrophilic colloid layers of the photographic material of the present invention can be incorporated water-insoluble or sparingly soluble synthetic polymer dispersions for the purpose of improving dimensional stability.

The photographic silver halide emulsions which are used in the present invention may be spectrally sensitized with methine dyes or other dyes. Dyes used for this purpose include cyanine dyes, merocyanine dyes, complex cyanine dyes, complex merocyanine dyes, holopolar cyanine dyes, hemicyanine dyes, styryl dyes and hemioxonol dyes. Particularly useful dyes are cyanine dyes, merocyanine dyes, and complex merocyanine dyes. These dyes can contain any conventional basic heterocyclic nuclei used for cyanine dyes.

These sensitizing dyes may be used singly or as a combination thereof. A combination of sensitizing dyes is frequently used for the purpose of supersensitization.

Moreover, the photographic silver halide emulsion used in the present invention may further contain dyes having no spectral sensitization action by themselves but having a supersensitizing effect, or materials which do not substantially absorb visible light but having a supersensitizing effect. Examples of such materials are aminostilbene compounds substituted by nitrogen-containing heterocyclic groups (for example, those described in U.S. Pat. Nos. 2,933,390 and 3,635,721), aromatic organic acid formaldehyde condensation products (for example, those described in U.S. Pat. No. 3,743,510), cadmium salts and azaindene compounds.

The present invention can be applied to a multilayer multicolor photographic material having at least two differently spectrally sensitized silver halide photographic emulsion layers on a support. The multilayer natural color photographic material usually has at least one red-sensitive silver halide emulsion layer, at least one green-sensitive silver halide emulsion layer, and at least one blue-sensitive silver halide emulsion layer on a support. The order of the disposition of these emulsion layers can be suitably selected. Typically the red-sensitive silver halide emulsion layer contains a cyan-forming coupler, the green-sensitive halide emulsion layer contains a magenta-forming coupler, and the blue-sensitive silver halide emulsion layer contains a yellow-forming coupler, but different combinations may be employed, if desired.

In the photographic materials of the present invention, the photographic emulsion layers and other hydrophilic colloidal layers may contain inorganic or organic hardeners. Specific examples thereof include active vinyl compounds (e.g., 1,3,5-triacryloyl-hexahydro-s-triazine or 1,3-vinylsulfonyl-2-propanol), active halogen compounds (e.g., 2,4-dichloro-6-hydroxy-s-triazine) and mucohalogenic acids (e.g., mucochloric acid or mucophenoxychloric acid). Such hardeners may be used individually or as a combination of two or more thereof.

The photographic material of the present invention may contain hydroquinone derivatives, aminophenol derivatives, gallic acid derivatives, or ascorbic acid derivatives as color fog preventing agents.

The photographic material of the present invention may contain an ultraviolet light absorbing agent in a hydrophilic colloid layer thereof. Examples of the ultraviolet light absorbing agents used are benzotriazole compounds substituted with an aryl group described in U.S. Pat. Nos. 3,533,794 and 4,236,013, Japanese Patent Publication No. 6540/76 and European Pat. No. 57,160, butadiene compounds described in U.S. Pat. Nos. 4,045,229 and 4,195,999, cinnamic acid ester compounds described in U.S. Pat. Nos. 3,705,805 and 3,707,375, benzophenone compounds described in U.S. Pat. No. 3,215,530 and British Pat. No. 1,321,355, and polymer compounds having ultraviolet light absorbing residues described in U.S. Pat. Nos. 3,761,272 and 4,431,726.

Further, brightening agents having an ultraviolet light absorbing function described in U.S. Pat. No. 3,499,762 and 3,700,455 may be used. Typical examples of the ultraviolet light absorbing agents are also described in *Research Disclosure* No. 24239 (June, 1984).

The photographic material of the present invention may contain water-soluble dyes as filter dyes or for irradiation prevention or other various purposes in a hydrophilic colloid layer thereof. These dyes include oxonol dyes, hemioxonol dyes, styryl dyes, merocyanine dyes, cyanine dyes, and azo dyes. Among these dyes, oxonol dyes, hemioxonol dyes and merocyanine dyes are advantageous.

In the present invention, the following known color fading preventing agents may be used together and, also, the color fading preventing agents which are used in the present invention can be utilized solely or as a combination of two or more these agents. Examples of known color fading preventing agents are hydroquinone derivatives, gallic acid derivatives, p-alkoxyphenols, p-oxyphenol derivatives, and bisphenols.

The color photographic emulsion layer which constitutes a dye image layer according to the present invention can be coated on a flexible support such as a plastic film, paper or cloth, conventionally used for photographic materials. Useful flexible supports include films composed of semi-synthetic or synthetic polymers such as cellulose acetate, cellulose acetate butyrate, polystyrene, polyethylene terephthalate and polycarbonate, and papers coated or laminated with a baryta layer or an $\alpha$-olefin polymer (for example, polyethylene and polypropylene). The support may be colored with a dye or a pigment, or may be blackened for shielding light.

It is preferred to add a white pigment to a support or a laminate layer, when the support is employed for reflection type photographic materials. Examples of the white pigments include titanium dioxide, barium sulfate, zinc oxide, zinc sulfide, calcium carbonate, antimony trioxide, silica white, alumina white, titanium phosphate, etc. Of these pigments, titanium dioxide, barium sulfate, zinc oxide are particularly preferred.

The surface of the support is generally subjected to subbing treatment for improving adhesion of a photographic emulsion layer or other hydrophilic colloidal layer. The support surface may be subjected to corona discharge treatment, ultraviolet light irradiation treatment or flame treatment before or after the subbing treatment.

In a support for reflection type photographic materials, a hydrophilic colloid layer containing a white pigment in a high content, may be further provided between the support and the emulsion layer in order to improve whiteness and sharpness of photographic images.

In reflection-type photographic materials containing the cyan coupler according to the present invention, a paper support laminated with a polymer is often employed as a support. However, it is particularly preferred to use a synthetic resin film containing a white pigment since photographic images excellent in saturation and reproduction of dark portions are obtained in addition to improvements in smoothness, glossness and sharpness. In such materials, polyethylene terephthalate and cellulose acetate are particularly useful as a synthetic resinous material and barium sulfate and titanium oxide are particularly useful as a white pigment.

To the color photographic material of the present invention, various photographic additives known in this field, for example, stabilizers, antifoggants, surface active agent, antistatic agents and developing agents can be added in addition to the above described compounds, if desired. Examples of such additives are described in *Research Disclosure*, No. 17643.

Further, to silver halide emulsion layers or other hydrophilic colloid layers, substantially light-insensitive fine grain silver halide emulsions (for example, a silver chloride, silver bromide or silver chlorobromide emulsion having an average particle size of about 0.20$\mu$ or less) may be added, if desired.

Color developing solutions used in processing materials according to the present invention are preferably alkaline aqueous solutions containing aromatic primary amine color developing agents as main components. Typical examples of the color developing agents include 4-amino-N,N-diethylaniline, 3-methyl-4-amino-N,N-diethylaniline, 4-amino-N-ethyl-N-$\beta$-hydroxyethylaniline, 3-methyl-4-amino-N-ethyl-N-$\beta$-hydroxyethylaniline, 3-methyl-4-amino-N-ethyl-N-$\beta$-methanesulfonamidoethylaniline and 4-amino-3-methyl-N-ethyl-N-$\beta$-methoxyethylaniline.

The color developing solutions can further contain pH buffering agents such as sulfites, carbonates, borates and phosphates of alkali metals, development inhibitors or antifogging agents such as bromides, iodides or organic antifogging agents. In addition, if desired, the color developing solutions can contain water softeners; preservatives such as hydroxylamine; organic solvents such as benzyl alcohol or diethylene glycol; development accelerators such as polyethylene glycol, quaternary ammonium salts or amines; dye forming couplers; competing couplers; fogging agents such as sodium borohydride; auxiliary developing agents such as 1-phenyl-3-pyrazolidone; viscosity-imparting agents; polycarboxylic acid type chelating agents described in U.S. Pat. No. 4,083,723: antioxidants described in West German Patent Application (OLS) No. 2,622,950; and other conventional additives.

After color development, the photographic emulsion layer is usually subjected to a bleach processing. This bleach processing may be performed simultaneously with a fix processing, or they may be performed independently.

Bleaching agents which can be used include compounds of polyvalent metals, for example, iron (III), cobalt (III), chromium (VI), and copper (II), peracids, quinones and nitroso compounds, including, e.g., ferricyanides; dichromates; organic complex salts of iron (III) or cobalt (III), for example, complex salts of aminopolycarboxylic acids (e.g., ethylenediaminetetraacetic acid, nitrilotriacetic acid, and 1,3-diamino-2-propanoltetraacetic acid) or organic acids (e.g., citric acid, tartaric acid or malic acid); persulfates; permanganates; and nitrosophenol. Of these compounds, potassium ferricyanide, iron (III) sodium ethylenediaminetetraacetate, and iron (III) ammonium ethylenediaminetetraacetate are particularly useful. Ethylenediaminetetraacetic acid iron (III) complex salts are useful in both an independent bleaching solution and a mono-bath bleach-fixing solution.

After color development or blleach-fix processing step, washing with water may be conducted.

Color development can be practiced at an appropriate temperature ranging from about 18° C. to 55° C. Color development is conducted preferably at about 30° C. or higher and particularly at about 35° C. or higher. The time necessary for development is in a range from about 1 minute to about 3.5 minutes and the shorter time is preferred. For continuous development processing, it is preferred to replenish processing solutions. Typically, replenisher amounts of about 160 ml to 330 ml per $m^2$ and preferably about 100 ml or less per $m^2$ of the photographic materials to be processed may be employed. The concentration of benzyl alcohol in the developing solution is about 20 ml or less and preferably about 10 ml or less per liter thereof.

Bleach-fixing can be practiced at an appropriate temperature ranging from about 18° C. to 50° C., and preferably at about 30° C. or higher. When the bleach-fixing is conducted at about 35° C. or higher, it is possible to shorten the processing time to a range of about 1 minute or less and to reduce the amount of replenisher to be added. The time necessary for washing with water after color development or bleach-fixing is usually within about 3 minutes. It is also possible to carry out the washing with water within about 1 minute by using a stabilizing bath.

Dyes formed are decomposed not only by light, heat or temperature but also by mold during preservation. Since cyan color images are particularly affected by mold, it is preferred to employ antimolds. Specific examples of antimolds include 2-thiazolylbenzimidazoles described in Japanese Patent Application (OPI) No. 157244/82. Antimolds can be incorporated into the photographic material or may be added thereto from the processing solution during development processing. Antimold can be included in photographic materials in any appropriate steps so long as photographic materials contain them after processing.

The present invention can be applied to conventional silver halide color photographic materials such as color negative films, color paper, color positive films, color reversal films for slides, color reversal films for cinema or color reversal films for television. Particularly, when the present invention is applied to color negative films and color reversal films requiring high sensitivity and high image quality, remarkable improvements in sharpness and graininess are recognized.

The present invention can be also applied to photographic materials employing a black color forming coupler process and a three coupler mixing process. The black color forming coupler process is described in detail in U.S. Pat. Nos. 3,622,629, 3,734,735 and 4,126,461, Japanese Patent Application (OPI) Nos. 105247/80, 42725/77 and 105248/80. The three coupler mixing processes are described in detail in *Research Disclosure*, No. 17123 (July, 1978).

The present invention will be explained in greater detail with reference to the following examples, but the present invention should not be construed as being limited thereto.

EXAMPLE 1

Each of the samples 1A to 1E was prepared by coating, in succession, the following silver halide emulsion layers and a protective layer on a cellulose triacetate film support.

To 180 g of Coupler (1) were added 100 ml of dibutyl phthalate and 100 ml of ethyl acetate and the coupler was dissolved therein by heating to 60° C. The solution thus prepared was mixed with 1,000 ml of an aqueous solution containing 100 g of gelatin and 10 g of sodium dodecylbenzenesulfonate at 50° C. and the mixture was stirred at high speed by means of a homogenizer to prepare a finely dispersed coupler dispersion.

To 350 g of the coupler dispersion thus obtained was added 1 kg of a silver iodobromide emulsion containing 80 g of silver, having a silver iodide/silver bromide mole ratio of 6/94 and having an average particle size of 0.8 μm. The resulting emulsion was coated on the above-described support at a coupler coated amount of $7\times10^{-4}$ mole/$m^2$. Then, a gelatin protective layer was coated on the emulsion layer at a dry layer thickness of 1 micron to prepare Sample 1A.

By following the same procesure as above using each of Couplers (2) and (14) in such a manner that the amount of coupler coated (mole/$m^2$) and the mixing mole ratio of the coupler and silver were same as those of sample 1A, Sample 1B and Sample 1C were prepared.

Furthermore, by following the same procedure as in preparing Sample 1A except that the following Couplers (101) and (102) outside of the scope of the present invention were used as comparison couplers, Sample 1D and Sample 1E were prepared.

Coupler (101):

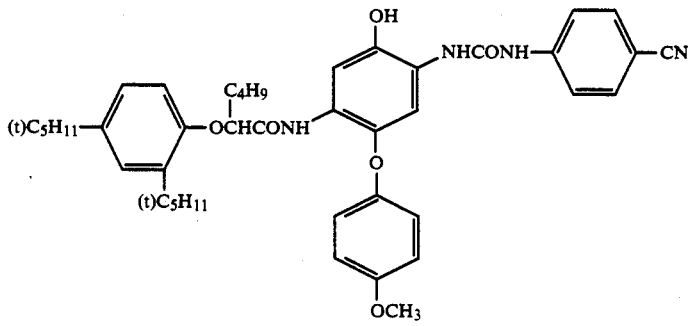

Coupler (102):

-continued

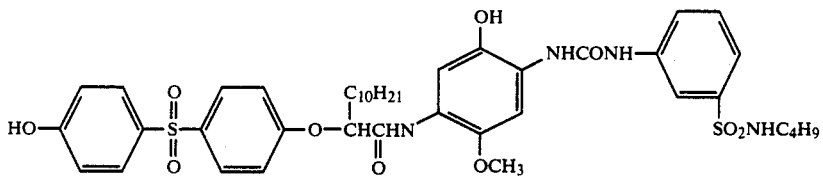

Each of these samples was exposed through a wedge for sensitometry and subjected to development processing using the following processing steps at 38° C.:

| | |
|---|---|
| 1. Color Development | 3 min. 15 sec. |
| 2. Bleaching | 6 min. 30 sec. |
| 3. Washing with Water | 3 min. 15 sec. |
| 4. Fixing | 6 min. 30 sec. |
| 5. Washing with Water | 3 min. 15 sec. |
| 6. Stabilizing | 3 min. 15 sec. |

The compositions of the processing solutions used for the above processing steps were as follows:

| | |
|---|---|
| Color Developing Solution: | |
| Sodium Nitrilotriacetate | 1.0 g |
| Sodium Sulfite | 4.0 g |
| Sodium Carbonate | 30.0 g |
| Potassium Bromide | 1.4 g |
| Hydroxylamine Sulfate | 2.4 g |
| 4-(N—Ethyl-N—β-hydroxyethylamino)-2-methylaniline Sulfate | 4.5 g |
| Water to make | 1 liter |
| Bleaching Solution: | |
| Ammonium Bromide | 160.0 g |
| Aqueous Ammonia (28%) | 25.0 ml |
| Sodium Ethylenediaminetetraacetato Ferrate | 130.0 g |
| Glacial Acetic Acid | 14.0 ml |
| Water to make | 1 liter |
| Fixing Solution: | |
| Sodium Tetrapolyphosphate | 2.0 g |
| Sodium Sulfite | 4.0 g |
| Ammonium Thiosulfate (70%) | 175.0 ml |
| Sodium Bisulfite | 4.6 g |
| Water to make | 1 liter |
| Stabilizing Solution: | |
| Formaldehyde | 8.0 ml |
| Water to make | 1 liter |

The density of the images of the processed samples was measured by red light and the results thus obtained are shown in Table 1.

TABLE 1

| Sample No. | Coupler | Relative Sensitivity | Maximum Density |
|---|---|---|---|
| 1A | Coupler (1) (Present Invention) | 100 | 1.42 |
| 1B | Coupler (2) (Present Invention) | 97 | 1.42 |
| 1C | Coupler (14) (Present Invention) | 95 | 1.40 |
| 1D | Coupler (101) (Comparison) | 88 | 1.34 |
| 1E | Coupler (102) (Comparison) | 85 | 1.32 |

As is apparent from the results shown in Table 1, the couplers according to the present invention show significantly improved sensitivity as compared to the comparison couplers. Also, the peak wavelength of the absorption spectrum of the dye formed and the absorption curve sharply decreasing to zero at the short wavelength side are satisfactory in the case of using the coupler according to the present invention.

Next, the fastness of each developed sample film was tested. The fastness of the developed samples when they were allowed to stand in the dark for 14 days at 80° C., the fastness of the developed samples when they were allowed to stand in the dark for 6 weeks at 60° C. and 70% RH, and the fastness of the developed samples when they were exposed to light for 6 days using a xenon test machine (100,000 lux) were determined by measuring the rate of reduction in density at an initial density of 1.0 in each case. Further, the increase of blue light density in the fog portion (stain) after standing for 14 days at 80° C. was measured. The results thus obtained are shown in Table 2.

TABLE 2

| Sample No. | Coupler | Rate of Reduction in Color Image Density: 14 Days at 80° C. (%) | 6 Weeks at 60° C. 70% RH (%) | 6 Days to Xenon Light (%) | Stain 14 Days at 80° C. |
|---|---|---|---|---|---|
| 1A | Coupler (1) (Present Invention) | 1 | 2 | 3 | 0.02 |
| 1B | Coupler (2) (Present Invention) | 2 | 2 | 4 | 0.03 |
| 1C | Coupler (14) (Present Invention) | 2 | 3 | 3 | 0.02 |
| 1D | Coupler (101) (Comparison) | 2 | 2 | 4 | 0.02 |
| 1E | Coupler (102) (Comparison) | 8 | 9 | 10 | 0.15 |

As is apparent from the results shown in Table 2, the heat resistance of the color images formed by the couplers according to the present invention is very satisfactory, and the amount of stain occurred is small.

EXAMPLE 2

A multilayer color photographic material was prepared by forming the layers having the following compositions on a polyethylene terephthalate film support.

First Layer: Antihalation Layer

Black colloidal silver, silver coated amount: 0.18 g/m$^2$.
Gelatin: 1.1 g/m$^2$.

Second Layer: Intermediate Layer 2,5-di-tert-pentadecylhydroquinone: 0.18 g/m$^2$.
Gelatin: 1.0 g/m$^2$.

Third Layer: First Red-Sensitive Emulsion Layer

A silver iodobromide emulsion (iodide content: 5 mol %), silver coated amount: 1.6 g/m$^2$.
Sensitizing Dye I: $4.5\times10^{-4}$ mol per mole of silver.
Sensitizing Dye II: $1.5\times10^{-4}$ mol per mol of silver.

Coupler (103): 0.04 mol per mole of silver.
Coupler EX-1: 0.003 mol per mol of silver.
Coupler EX-7: 0.0006 mol per mol of silver.

Fourth Layer: Second Red-Sensitive Emulsion Layer

A silver iodobromide emulsion (iodide content: 10 mol %), silver coated amount: 1.4 g/m$^2$.
Sensitizing Dye I: $3\times10^{-4}$ mol per mol of silver.
Sensitizing Dye II: $1\times10^{-4}$ mol per mol of silver.
Coupler (1): 0.022 mol per mol of silver.
Coupler EX-1: 0.0016 mol per mol of silver.

Fifth Layer: Intermediate Layer

Same as the Second Layer.

Sixth Layer: First Green-Sensitive Emulsion Layer

A silver iodobromide emulsion (iodide content: 4 mol %), silver coated amount: 1.2 g/m$^2$.
Sensitizing Dye III: $5\times10^{-4}$ mol per mol of silver.
Sensitizing Dye IV: $2\times10^{-4}$ mol per mol of silver.
Coupler EX-2: 0.05 mol per mol of silver.
Coupler EX-3: 0.008 mol per mol of silver.
Coupler EX-7: 0.0015 mol per mol of silver.

Seventh Layer: Second Green-Sensitive Emulsion Layer

A silver iodobromide emulsion (iodide content: 8 mol %), silver coated amount: 1.3 g/m$^2$.
Sensitizing Dye III: $3\times10^{-4}$ mol per mol of silver.
Sensitizing Dye IV: $1.2\times10^{-4}$ mol per mol of silver.
Coupler EX-5: 0.017 mol per mol of silver.
Coupler EX-4: 0.003 mol per mol of silver.
Coupler EX-8: 0.0003 mol per mol of silver.

Eighth Layer: Yellow Filter Layer

A gelatin layer containing yellow colloidal silver and an emulsified dispersion of 2,5-di-tert-octylhydroquinone.

Ninth Layer: First Blue-Sensitive Emulsion Layer

A silver iodobromide emulsion (iodide content: 6 mol %), silver coated amount: 0.7 g/m$^2$.
Coupler EX-6: 0.25 mol per mol of silver.
Coupler EX-7: 0.015 mol per mol of silver.

Tenth Layer: Second Blue-Sensitive Emulsion Layer

A silver iodobromide emulsion (iodide content: 6 mol %), silver coated amount: 0.6 g/m$^2$.
Coupler EX-6: 0.06 mol per mol of silver.

Eleventh Layer: First Protective Layer

Silver iodobromide (iodide content: 1 mol%, average particle size: 0.07 $\mu$), silver coated amount: 0.5 g/m$^2$.
Ultraviolet Light Absorbing Agent UV-1: 0.11 g/m$^2$.
Gelatin: 0.9 g/m$^2$.

Twelfth Layer: Second Protective Layer

A polymethyl methacrylate particles (diameter of about 1.5 $\mu$m): 0.54 g/m$^2$.
Gelatin: 0.8 g/m$^2$.

In each of the above described layers were further incorporated Gelatin Hardening Agent H-1 and a surface active agent in addition to the above-described compounds.

The sample thus prepared was designated Sample 2A.

The compounds used for preparing Sample 2A were as follows:

Coupler (103):

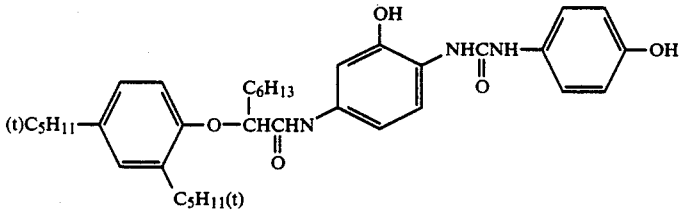

Coupler EX-1:

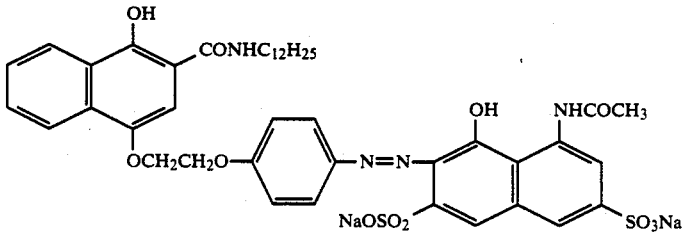

Coupler EX-2:
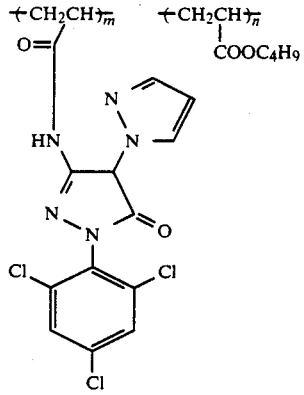
m/n = 1/1 (Weight ratio)
Coupler EX-3:
-continued
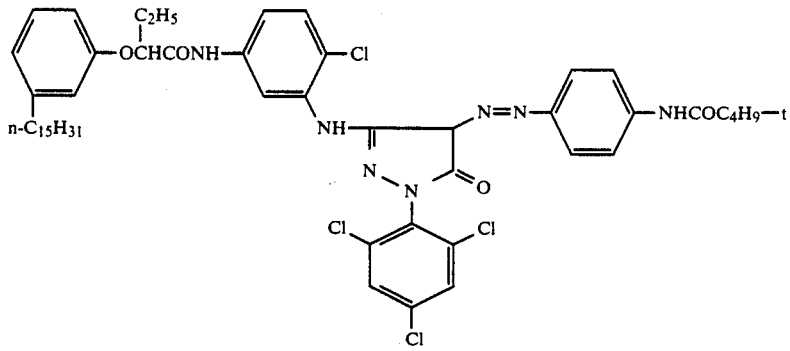
Coupler EX-4:
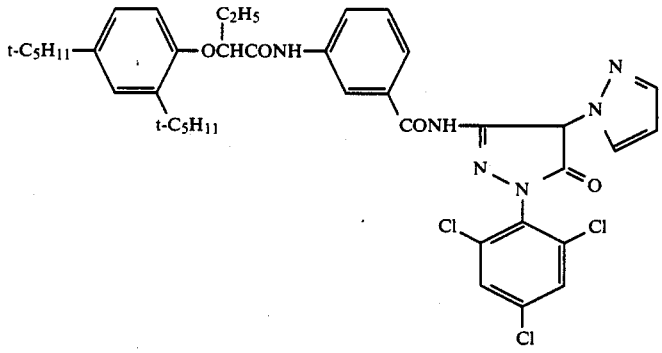
Coupler EX-5:
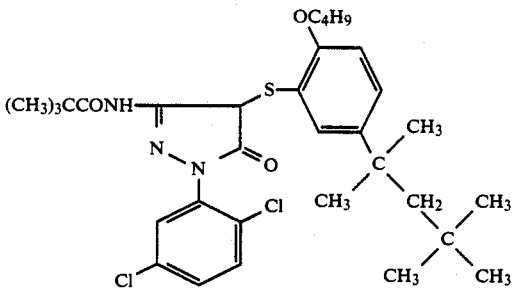
Coupler EX-6:
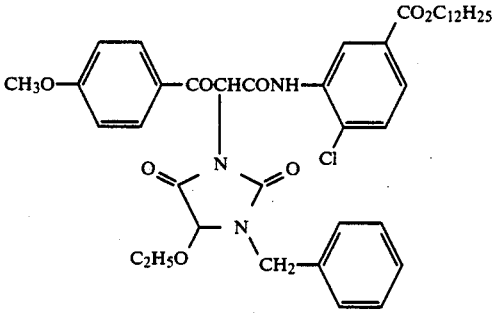
Coupler EX-7:
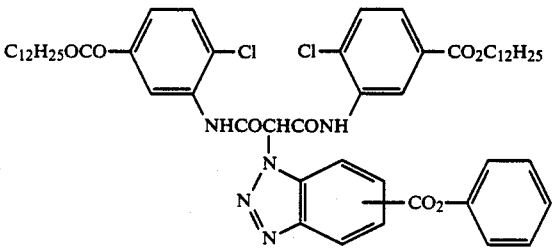

-continued

Coupler EX-8:

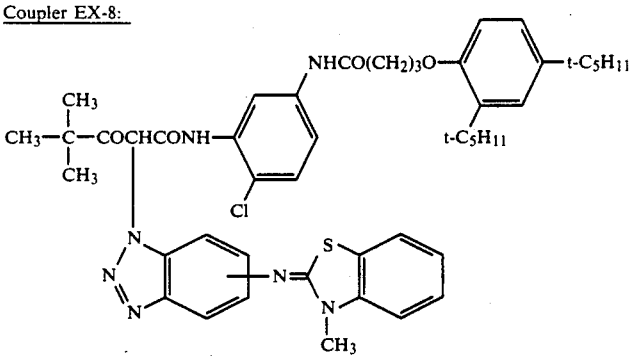

H-1

$(CH_2{=}CH{-}SO_2CH_2CONHCH_2)_2$

UV-1

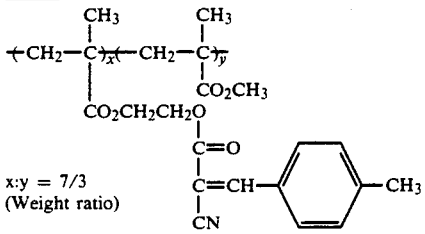

x:y = 7/3
(Weight ratio)

Sensitizing Dye I:

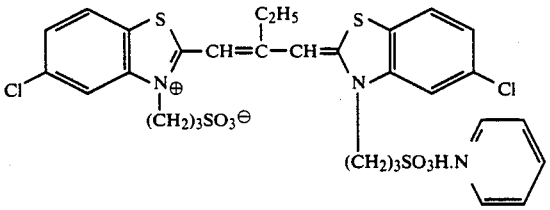

Sensitizing Dye II:

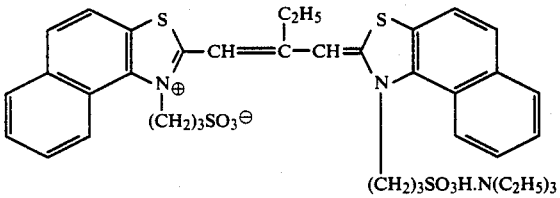

Sensitizing Dye III:

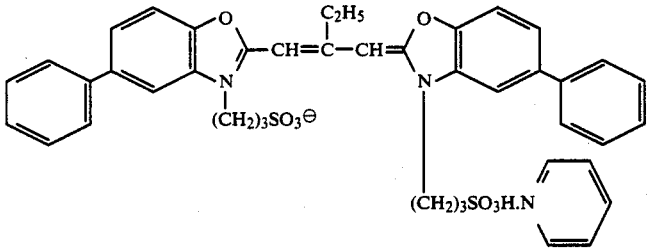

Sensitizing Dye IV:

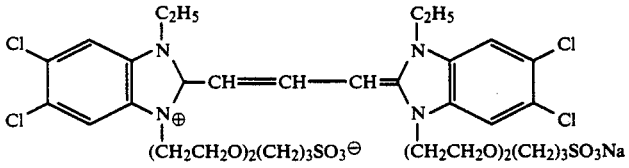

Also, by following the same procedure as in preparing Sample 2A except for using each of Coupler (14) according to the present invention, Comparison Couplers (101) and (102) in place of Coupler (1) in the fourth layer of Sample 2A, Samples 2B, 2C and 2D, respectively, were prepared.

Furthermore, by following the same procedure as above except that Comparison Coupler (101) was used in place of Coupler (1) in the fourth layer of Sample 2A and the coated amount thereof was changed to 0.031 mole per mole of silver, Sample 2E was prepared.

These samples thus prepared were exposed to white light and processed in the same processing as described in Example 1.

The optical densities of the developed samples were measured by red light, and the results are shown in Table 3.

TABLE 3

| Film Sample No. | Couplers in First Red-Sensitive Emulsion Layer | Couplers in Second Red-Sensitive Emulsion Layer | Relative Sensitivity |
|---|---|---|---|
| 2A | 103/EX-1/EX-7 | (1)/EX-1 | 100 |
| 2B | 103/EX-1/EX-7 | (14)/EX-1 | 96 |

TABLE 3-continued

| Film Sample No. | Couplers in First Red-Sensitive Emulsion Layer | Couplers in Second Red-Sensitive Emulsion Layer | Relative Sensitivity |
|---|---|---|---|
| 2C | 103/EX-1/EX-7 | (101)/EX-1 | 84 |
| 2D | 103/EX-1/EX-7 | (102)/EX-1 | 80 |
| 2E | 103/EX-1/EX-7 | (101)*/EX-1 | 95 |

*The coated amount of Coupler (101) was 1.4 times that of Sample 2C.

As is apparent from the results in Table 3, it can be seen that the couplers according to the present invention showed significantly improved sensitivity.

Further, the couplers according to the present invention were excellent in graininess as compared to that of Sample 2E wherein the coated amount of the comparison coupler was increased in order to increase the sensitivity. More specifically, RMS values of Film Samples 2A and 2B were 0.009 respectively, while that of Film Sample 2E was 0.010.

While the invention has been described in detail and with reference to specific embodiments thereof, it will be apparent to one skilled in the art that various changes and modifications can be made therein without departing from the spirit and scope thereof.

What is claimed is:

1. A silver halide color photographic material comprising a support having thereon at least one silver halide emulsion layer wherein the photograhic material contains at least one cyan color image forming coupler represented by the general formula (I) described below substituted with at least one substituent represented by the general formula (II) described below:

[I]

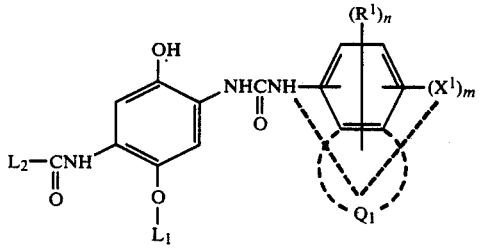

wherein $X^1$ represents a cyano group, a sulfonyl group, an acyl group, a sulfamoyl group, a carbamoyl group, a sulfonamido group, a carbonamido group, a sulfamido group, a trifluoromethyl group or a halogen atom; m represents an integer of 1 to 5 when $X^1$ represents a halogen atom, and an integer of 1 to 3 when $X^1$ represents a group other than a halogen atom, and when m represents an integer of 2 or more, $X^1$ may be the same or different; $R^1$ represents a substituent on the benzene ring or a condensed ring including the benzene ring; n represents 0 or an integer of 1 to 6; $Q^1$ represents a non-metallic atomic group necessary to form a 5-membered or 6-membered condensed ring including the benzene ring which may or may not be present; $X^1$, $R^1$ and the ureido group may be bonded at any position of the benzene ring and the condensed ring formed with $Q^1$; $m=n\leqq 7$; $L_1$ represents a group capable of being released as $L_1$-$0^{\Phi}$ upon the reaction with an oxidation product of a color developing agent and is selected from a substituted alkyl group, a substituted aryl group and a heterocyclic group; and $L_2$ represents an alkyl group, an aryl group, a heterocyclic group, an alkyloxy group, an aryloxy group or an amino group;

[II]

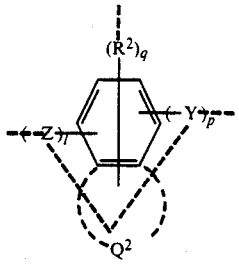

wherein Z represents a hydroxy group, a carbonamido group, a sulfonamido group, a sulfamido group, an oxycarbonamido group, a sulfinamido group or a phosphonamido group; l represents an integer of 1 to 3; Y represents a sulfonyl group, a sulfamoyl group, an acyl group, an oxycarbonyl group, a carbamoyl group, a phosphonyl group, a phosphamoyl group or an imino group; p represents an integer of 1 to 2; $R^2$ represents a substituent other than the groups represented by Z and Y which may be on the benzene ring or a condensed ring including the benzene ring; q represents 0 or an integer of 1 to 6; $Q^2$ represents a non-metallic atomic group necessary to form a 5-membered or 6-membered condensed ring including the benzene ring which may or may not be present; Z, Y and $R^2$ may be present at any position of the benzene ring and the condensed ring formed with $Q^2$; $p+q+l<8$; and the group represented by the general formula (II) is connected to the coupler represented by the general formula (I) through Y, Z or $R^2$.

2. A silver halide color photographic material as claimed in claim 1, wherein the substituent represented by $R^1$ is an alkyl group, an alkoxy group, an acyloxy group or an oxycarbonyl group each of which may be further substituted.

3. A silver halide color photographic material as in claimed claim 1, wherein the condensed ring formed by the benzene ring and $Q^1$ is a naphthalene ring, a quinoline ring, an isoquinoline ring, a benzotriazole ring, a benzimidazole ring, a benzothiazole ring, a benzoxazole ring, an indole ring, an indazole ring or a phthalimide ring.

4. A silver halide clor photographic material as claimed in claim 1, wherein the substituent represented by $R^2$ is a halogen atom, a cyano group, a nitro group, a carboxy group, a sulfo group, an alkyl group which may be substituted, an aryl group which may be substituted, an alkoxy group which may be substituted or an acyloxy group which may be substituted.

5. A silver halide color photographic material as claimed in claim 1, wherein the condensed ring formed by the benzene ring and $Q^2$ is a naphthalene ring, a quinoline ring, an isoquinoline ring, a benzotriazole ring, a benzimidazole ring, a benzothiazole ring, a benzoxazole ring, an indole ring, an indazole ring or a phthalimide ring.

6. A silver halide color photographic materials as claimed in claim 1, wherein the group represented by the general formula (II) is connected through Y or Z thereof to $L_1$, $L_2$ or $X^1$ of the cyan coupler represented by the general formula (I).

7. A silver halide color photographic material as claimed in claim 1, wherein the cyan coupler represented by the general formula (I) is represented by the following formula (III):

[III]

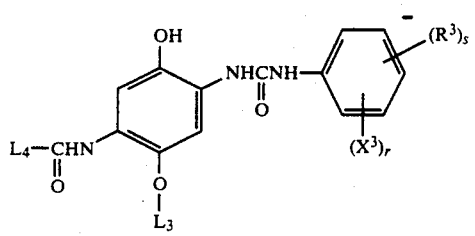

wherein $X^3$, $R^3$, $L_3$ and $L_4$ have the same meanings as defined for $X^1$, $R^1$, $L_1$ and $L_2$ in general formula (I) respectively; s represents 0 or an integer of 1 to 4; and r represents an integer of 1 to 5 when $X^3$ represents a halogen atom, and an integer of 1 to 2 when $X^3$ represents a group other than a halogen atom defined for $X^3$ and when r represents an integer of 2 or more, $X^3$ may be the same or different.

8. A silver halide color photographic material as claimed in claim 7, wherein at least one $X^3$ is present at the 3-position or 4-position to the ureido group and r represents an integer of 1 or 2.

9. A silver halide color photographic material as claimed in claim 8, wherein $X^3$ represents a cyano group, a sulfonyl group, a sulfonamido group, a sulfamoyl group, a carbonamido group, a carbamoyl group, a sulfamido group or a halogen atom.

10. A silver halide color photographic material as claimed in claim 9, wherein $X^3$ represents a cyano group or a sulfonyl group.

11. A silver halide color photographic material as claimed in claim 10, wherein the cyano group or sulfamoyl group is present at the 4-position to the ureido group when r is 1.

12. A silver halide color photographic material as claimed in claim 7, wherein $L_3$ represents a methyl group substituted with an electron attractive group or a substituted phenyl group.

13. A silver halide color photographic material as claimed in claim 7, wherein $L_4$ represents a substituted or unsubstituted alkyl group or a substituted or unsubstituted aryl group.

14. A silver halide color photographic material as claimed in claim 11, wherein the group represented by the general formula (II) is connected through Y or Z thereof to $L_3$, $L_4$ or $X^3$ of the cyan coupler represented by the general formula (III).

15. A silver halide color photographic material as claimed in claim 11, wherein the group represented by the general formula (II) is represented by the following general formula (IV):

[IV]

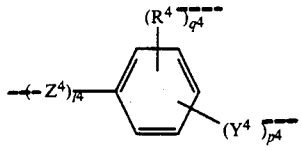

wherein $Y^4$, $Z^4$ and $R^4$ have the same meanings as defined for Y, Z and $R^2$ in the general formula (II) respectively; $p^4$ represents an integer of 1 or 2; $q^4$ represents 0 or an integer of 1 to 4; and $l^4$ represents an integer of 1 to 3.

16. A silver halide color photographic material as claimed in claim 11, wherein $Y^4$ represents a sulfonyl group, a sulfamoyl group, an acyl group or a carbamoyl group.

17. A silver halide color photograhic material as claimed in claim 15, wherein $Z^4$ represents a hydroxy group, a carbonamido group, a sulfanomido group or a sulfamido group.

18. A silver halide color photographic material as claimed in claim 15, wherein $Z^4$ and $Y^4$ are present in a ortho position or para position each other.

19. A silver halide color photographic material as claimed in claim 18, wherein $Z^4$ and $Y^4$ are present in a para position with respect to each other.

20. A silver halide color photographic material as claimed in claim 15, wherein the cyan coupler represented by the general formula (III) is represented by the following general formula (V):

[V]

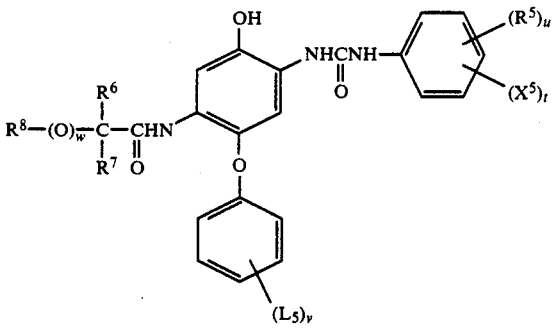

wherein $X^5$, $R^5$, t and u have the same meaning as defined for $X^3$, $R^3$, r and s in the general formula (III) respectively; $L_5$ represents a group represented by the general formula (IV), a halogen atom, an alkyl group, an alkoxy group, a carboxy group, a sulfo group, an acyl group, a carbamoyl group, a carbonamido group, a sulfamoyl group, a sulfonamido group, a sulfonyl group or a hydroxy group; $R^6$ and $R^7$ each represents a hydrogen atom, an alkyl group or an aryl group; $R^8$ represents an alkyl group or an aryl group, each of which may substituted with a group represented by the general formula (IV); v represents an integer of 1 to 5; and w represents 0 or an integer of 1.

* * * * *